US007050622B2

(12) United States Patent
Morishima et al.

(10) Patent No.: US 7,050,622 B2
(45) Date of Patent: May 23, 2006

(54) IMAGE COMPARISON APPARATUS, IMAGE COMPARISON METHOD, AND PROGRAM FOR CAUSING COMPUTER TO EXECUTE IMAGE COMPARISON

(75) Inventors: Masahiro Morishima, Hachioji (JP); Akitsugu Kagayama, Hachioji (JP); Ryoji Aoshima, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/635,821

(22) Filed: Aug. 5, 2003

(65) Prior Publication Data

US 2004/0037468 A1 Feb. 26, 2004

Related U.S. Application Data

(63) Continuation of application No. PCT/JP02/01364, filed on Feb. 18, 2002.

(30) Foreign Application Priority Data

Feb. 19, 2001 (JP) ............................. 2001-041931

(51) Int. Cl.
*G06K 9/00* (2006.01)

(52) U.S. Cl. ........................ 382/148; 348/129

(58) Field of Classification Search ................ 382/135, 382/148, 318; 356/71; 340/5.86; 348/129, 348/130, 161
See application file for complete search history.

(56) References Cited

U.S. PATENT DOCUMENTS

| | | | | |
|---|---|---|---|---|
| 3,916,439 A | * | 10/1975 | Lloyd et al. | ................... 358/81 |
| 4,587,617 A | * | 5/1986 | Barker et al. | ................ 364/507 |
| 4,589,140 A | * | 5/1986 | Bishop et al. | .................. 382/8 |
| 4,821,118 A | * | 4/1989 | Lafreniere | .................. 358/108 |
| 5,566,877 A | * | 10/1996 | McCormack | ................ 228/105 |
| 5,600,732 A | * | 2/1997 | Ott et al. | ..................... 382/112 |
| 6,351,550 B1 | * | 2/2002 | Inaoka et al. | ................ 382/135 |
| 6,381,355 B1 | * | 4/2002 | Goonetilleke | ................ 382/141 |
| 6,434,264 B1 | * | 8/2002 | Asar | ........................... 382/147 |
| 6,597,381 B1 | * | 7/2003 | Eskridge et al. | ............ 345/804 |

FOREIGN PATENT DOCUMENTS

| | | |
|---|---|---|
| EP | 1 067 487 A2 | 1/2001 |
| JP | 06-6807 A | 1/1994 |
| JP | 2000-116637 A | 4/2000 |
| JP | 2000-275594 A | 10/2000 |

* cited by examiner

*Primary Examiner*—Andrew W. Johns
(74) *Attorney, Agent, or Firm*—Frishauf, Holtz, Goodman & Chick, P.C.

(57) ABSTRACT

An image comparison apparatus includes an observation image capturing means for capturing at least one of a macroscopic observation image of a specimen and a microscopic observation image of the specimen, a photographing means for photographing an observation image captured by the observation image capturing means, a recording means for recording a reference image prepared in advance, and a display means for displaying the observation image photographed by the photographing means as a comparison image, and also displaying the reference image recorded on the recording means on the display means so as to allow comparison between the comparison image and the reference image.

38 Claims, 14 Drawing Sheets

42L  42R 43L  43R 42L  43R 43R  42L 43L  42R 42R  43L

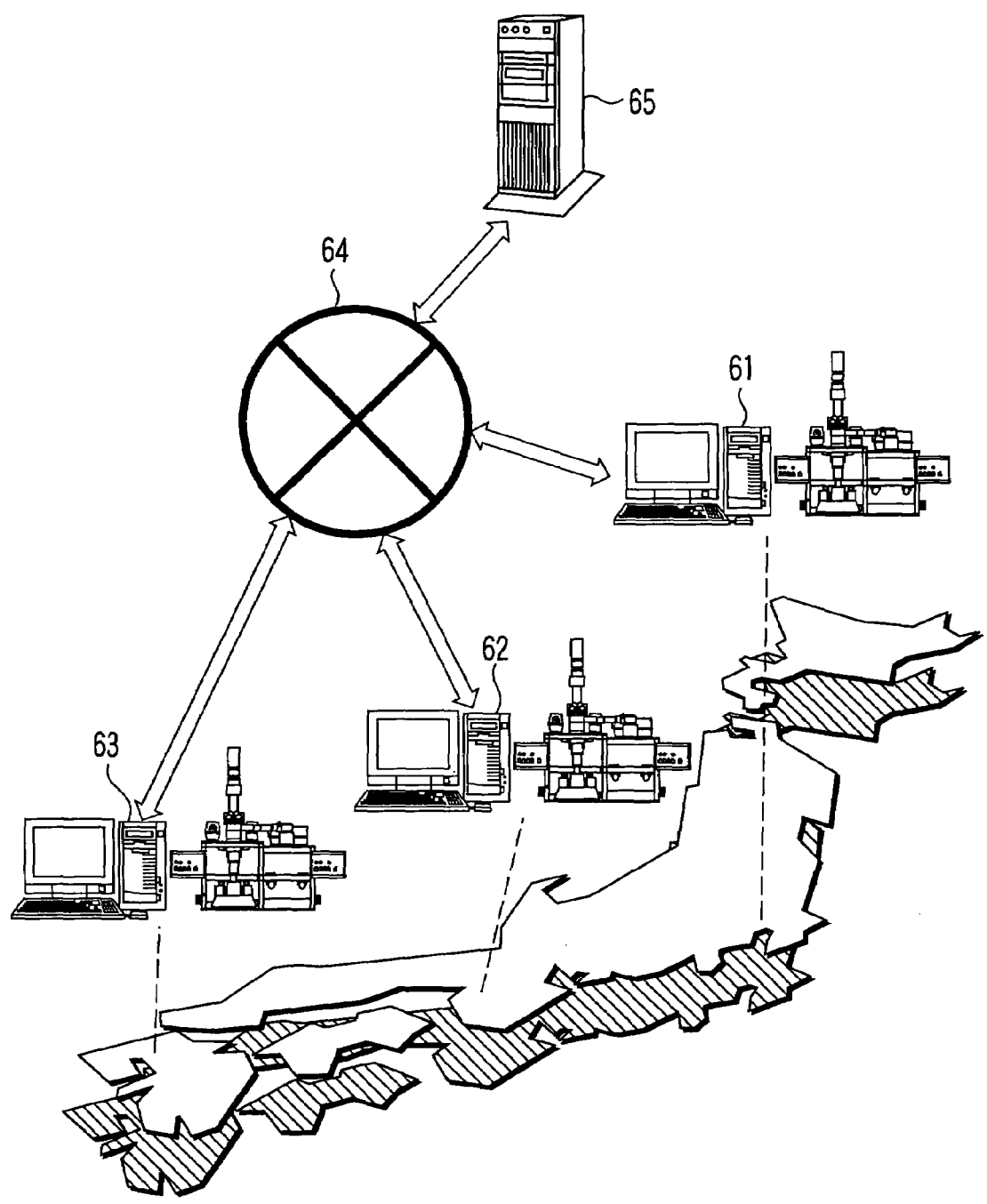
F I G. 12

IMAGE COMPARISON APPARATUS, IMAGE COMPARISON METHOD, AND PROGRAM FOR CAUSING COMPUTER TO EXECUTE IMAGE COMPARISON

CROSS-REFERENCE TO RELATED APPLICATIONS

This is a Continuation Application of PCT Application No. PCT/JP02/01364, filed Feb. 18, 2002, which was not published under PCT Article 21(2) in English.

This application is based upon and claims the benefit of priority from the prior Japanese Patent Application No. 2001-041931, filed Feb. 19, 2001, the entire contents of which are incorporated herein by reference.

BACKGROUND OF THE INVENTION

1. Field of the Invention

The present invention relates to an image comparison apparatus and image comparison method which compare a reference image as a sample with a comparison image as a comparison target, and a program for causing a computer to execute image comparison.

2. Description of the Related Art

Recently, many troubles have been caused by counterfeiting of printed matter, counterfeiting of special printing/treatment on ID cards, and the like. Counterfeiting methods associated with such troubles are so sophisticated as to make identification of counterfeits difficult. In addition, printing or treatment for preventing counterfeiting becomes too elaborate to be checked by the human eye.

Under the circumstances, a comparison microscope like the one shown in FIG. 1 has recently been proposed.

This comparison microscope includes two microscope bodies 202a and 202b. The microscope bodies 202a and 202b respectively have object lenses 203a and 203b. Specimens 204a ad 204b such as printed matter are placed on stages 205a and 205b corresponding to the object lenses 203a and 203b. A common comparison lens barrel 201 is connected to the microscope bodies 202a and 202b. This arrangement allows simultaneous observation of observation images formed by the microscope bodies 202a and 202b through an observation lens barrel 200. For example, the specimen 204a serving as a sample is placed on the stage 205a of the microscope body 202a. The specimen 204b serving as a comparison target is placed on the stage 205b of the microscope body 202b. An observation image of the right half of the specimen 204a in the visual field is abutted against an observation image of the left half of the specimen 204b in the visual field to allow observation of these images as one observation image through the observation lens barrel 200. This makes it possible to compare the left and right observation images and allow the user to easily check whether or not the specimens 204a and 204b are identical.

An apparatus using comparison microscopes like those described above requires a real specimen serving as a sample as well as a specimen serving as a comparison target for which counterfeit identification is required. Therefore, an observer who has no specimen as a sample cannot perform comparing operation, and has a difficulty in counterfeit identification. In addition, since the two microscope bodies 202a and 202b are used, variations in brightness and color between the optical systems of the microscope bodies 202a and 202b sometimes make it difficult to compare a comparison image with a reference image. It is important for counterfeit identification to facilitate recognition of the difference between images by positioning them for comparison. Such positioning, however, requires cumbersome operation, e.g., moving the positions of the specimens 204a and 204b on the stages 205a and 205b.

On the other hand, an image comparison apparatus for performing comparison and observation using reference images stored as digital images is known (see Jpn. Pat. Appln. KOKAI Publication No. 06-6807). In this image comparison apparatus, a plurality of images captured from a TV camera are stored as digital data. Subsequently, a half portion of a reference image and a half portion of a comparison image are extracted and pasted together to display them as one image on a monitor. This makes it possible to easily check whether or not the left and right images are identical.

In the above image comparison apparatus, recorded digital image are read out and compared with each other on the TV monitor. Since still images that have already captured (stored) are juxtaposed, a desired position on a reference image for comparison is difficult to adjust to a comparison image. In addition, since images are simply arranged side by side, it is sometimes difficult to observe the differences between them. When a reference image and comparison image are to be compared with each other, the same photographing conditions, e.g., a magnification, position, and brightness, are preferably set for these images. When image files obtained by photography in the past are used for comparison, photographing conditions cannot often be known. This makes it difficult to accurately compare and observe images. Assume that an observation window is split into two parts and two images are displayed therein to be compared in order to prevent a decrease in resolution. In this case, half images must be compared with each other, and hence comparison/observation of images must be performed at least twice. In addition, when an observation window is split into two parts and images are displayed therein, the observer may be confused about which image is a reference image or comparison image. Furthermore, since differences between two images are visually checked by the observer, an oversight and the like may occur.

BRIEF SUMMARY OF THE INVENTION

The present invention provides an image comparison apparatus and image comparison method which can accurately and efficiently perform comparison and observation of a reference image and a comparison image with simple operation, and a program which causes a computer to execute image comparison.

An image comparison apparatus according to the first aspect of the present invention is characterized by comprising observation image capturing means for capturing at least one of a macroscopic observation image of a specimen or a microscopic observation image of the specimen, photographing means for photographing an observation image captured by the observation image capturing means, recording means for recording a reference image prepared in advance, and display means for displaying the observation image photographed by the photographing means as a comparison image, and also displaying the reference image recorded on the recording means on the display means so as to allow comparison between the comparison image and the reference image.

An image comparison apparatus according to the second aspect of the present invention is characterized by comprising a macro-observation unit which captures a macroscopic observation image of a specimen, a micro-observation unit which captures a microscopic observation image of the specimen, a stage which moves the specimen between the macro-observation unit and the micro-observation unit, a camera which photographs an observation image of a specimen on the stage which is captured by the macro-observation unit and the micro-observation unit, optical path switching means for switching an optical path from the macro-observation unit or the micro-observation unit to the camera, a recording medium which records an observation image photographed by the camera as a reference image, and display means for displaying the observation image photographed by the camera as a comparison image and also displaying the reference image recorded on the recording medium so as to allow comparison between the images.

An image comparison method according to the third aspect of the present invention is characterized by comprising capturing at least one of a macroscopic observation image and a microscopic observation image of a specimen, photographing the captured observation image, and displaying an entire or part of a comparison image obtained from the photographed observation image and an entire or part of a reference image prepared in advance so as to allow comparison therebetween.

An image comparison method according to the fourth aspect of the present invention is characterized by comprising capturing a macroscopic observation image or a microscopic observation image of a specimen, photographing the captured observation image, and displaying an addition image obtained by adding a comparison image obtained from the photographed observation image to a reference image prepared in advance at an arbitrary ratio.

An image comparison method according to the fifth aspect of the present invention is characterized by comprising capturing a macroscopic observation image or a microscopic observation image of a specimen, photographing the captured observation image, and alternately displaying a comparison image obtained from the photographed observation image and a reference image prepared in advance at predetermined time intervals.

An image comparison method according to the sixth aspect of the present invention is characterized by comprising capturing a macroscopic observation image or a microscopic observation image of a specimen, photographing the captured observation image, performing subtraction between the photographed observation image and a reference image prepared in advance, and performing displaying on the basis of the subtraction result.

An image comparison method according to the seventh aspect of the present invention which is applied to a system in which at least two image comparison apparatuses and an image server capable of storing at least one image are connected through a network capable of data communication is characterized in that in each of the image comparison apparatuses, a reference image used for comparison with a comparison image acquired from a specimen can be read out from the image server through the network.

A computer program product according to the eighth aspect of the present invention is characterized by capturing at least one of a macroscopic observation image and a microscopic observation image of a specimen, photographing the captured observation image, and displaying an entire or part of a comparison image obtained from the photographed observation image and an entire or part of a reference image prepared in advance so as to allow comparison therebetween.

A computer program product according to the ninth aspect of the present invention is characterized by capturing a macroscopic observation image or a microscopic observation image of a specimen, photographing the captured observation image, and displaying an addition image obtained by adding a comparison image obtained from the photographed observation image to a reference image prepared in advance at an arbitrary ratio.

A computer program product according to the 10th aspect of the present invention is characterized by capturing a macroscopic observation image or a microscopic observation image of a specimen, photographing the captured observation image, and alternately displaying a comparison image obtained from the photographed observation image and a reference image prepared in advance at predetermined time intervals.

A computer program product according to the 11th aspect of the present invention is characterized by capturing a macroscopic observation image or a microscopic observation image of a specimen, photographing the captured observation image, performing subtraction between the photographed observation image and a reference image prepared in advance, and performing displaying on the basis of the subtraction result.

A computer program product according to the 12th aspect of the present invention which is applied to a system in which at least two image comparison apparatuses and an image server capable of storing at least one image are connected through a network capable of data communication, characterized in that in each of the image comparison apparatuses, a reference image used for comparison with a comparison image acquired from a specimen can be read out from the image server through the network.

An image comparison method according to the 13th aspect of the present invention is characterized in that a display window designated by a control apparatus connected, through a network capable of data communication, to an apparatus including photographing means for photographing an observation image of a specimen, display means for comparing the photographed observation image, and means for communicating a display method for image comparison is displayed by communication.

BRIEF DESCRIPTION OF THE SEVERAL VIEWS OF THE DRAWING

FIG. 12 is a view showing the schematic arrangement of the third embodiment of the present invention;

DETAILED DESCRIPTION OF THE INVENTION

The embodiments of the present invention will be described below with reference to the several views of the accompanying drawing.

First Embodiment

Figure 1:
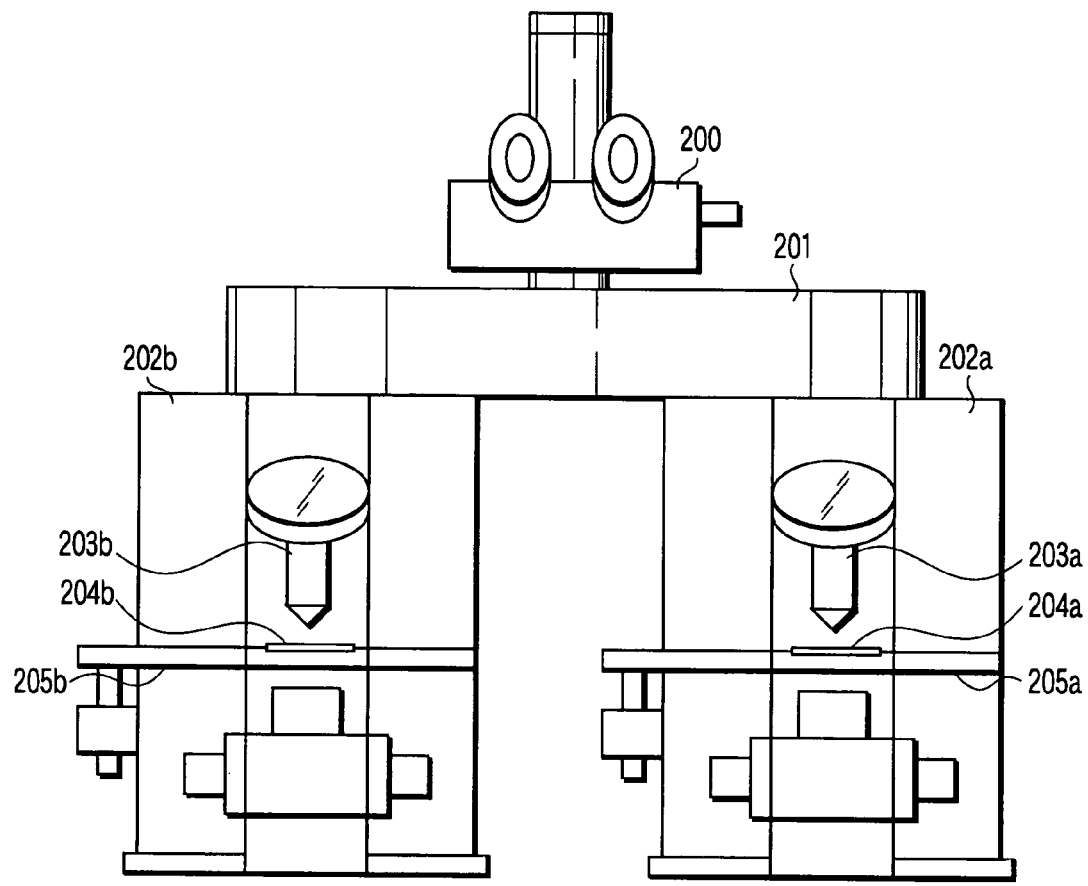
FIG. 1 is a view showing the schematic arrangement of a conventional comparison microscope.
Figure 2:
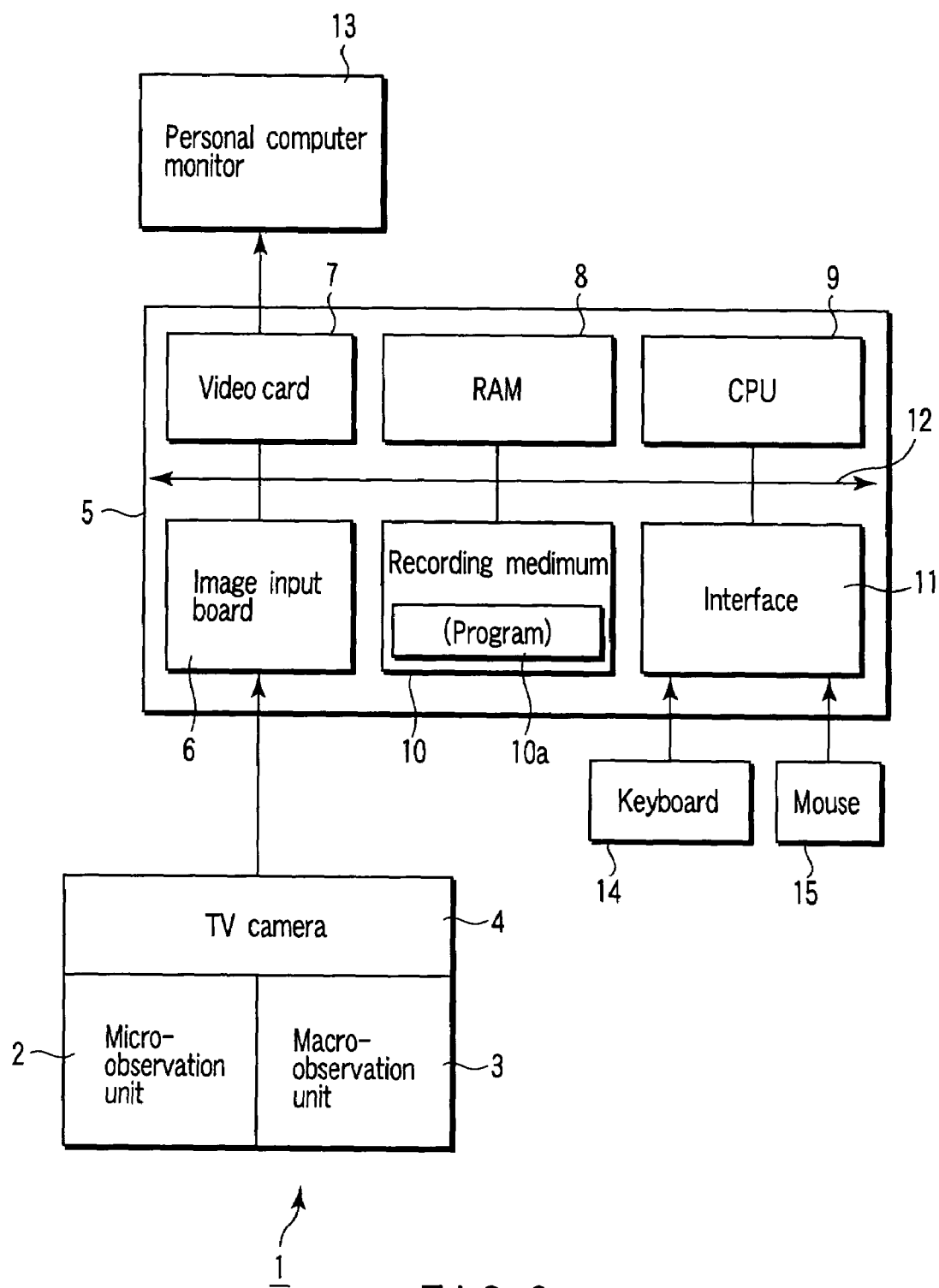
FIG. 2 is a block diagram showing a microscopic image comparison apparatus according to the first embodiment of the present invention.

FIG. 2 is a block diagram showing a microscopic image comparison apparatus as an embodiment of an image comparison apparatus according to the present invention.

Referring to FIG. 2, an observation device 1 for observing a specimen (not shown) includes a micro-observation unit 2 which serves as a micro-observation image capturing means for capturing a microscopic observation image of the specimen so as to capture a microscopic observation image, a macro-observation unit 3 which serves as a macro-observation image capturing image for capturing a macroscopic observation image of the specimen, and a TV camera 4 serving as a photographing means. The observation device 1 sends out the observation image captured by the micro-observation unit 2 or macro-observation unit 3, as a digital image, to a personal computer body 5 serving as a control means through the TV camera 4.

The personal computer body 5 includes an image input board 6, video card 7, RAM 8, CPU 9, recording medium 10, interface 11, and bus 12. The personal computer body 5 stores, in the RAM 8, the digital image captured from the TV camera 4 into the image input board 6, or displays the image as a still or live image on a personal computer monitor 13 serving as a display means through the video card 7 (a live image is displayed at the video rate of the TV camera 4). A plurality of digitalized reference images which are prepared in advance are recorded on the recording medium 10. A program 10a such as image comparison software is also recorded on the recording medium 10. The program 10a is temporarily recorded on the RAM 8 and executed by the CPU 9 to perform image comparison processing. A keyboard 14 and mouse 15 are connected to the interface 11. The keyboard 14 and mouse 15 are used to input instructions when the program 10a is to be executed.

Figure 3:
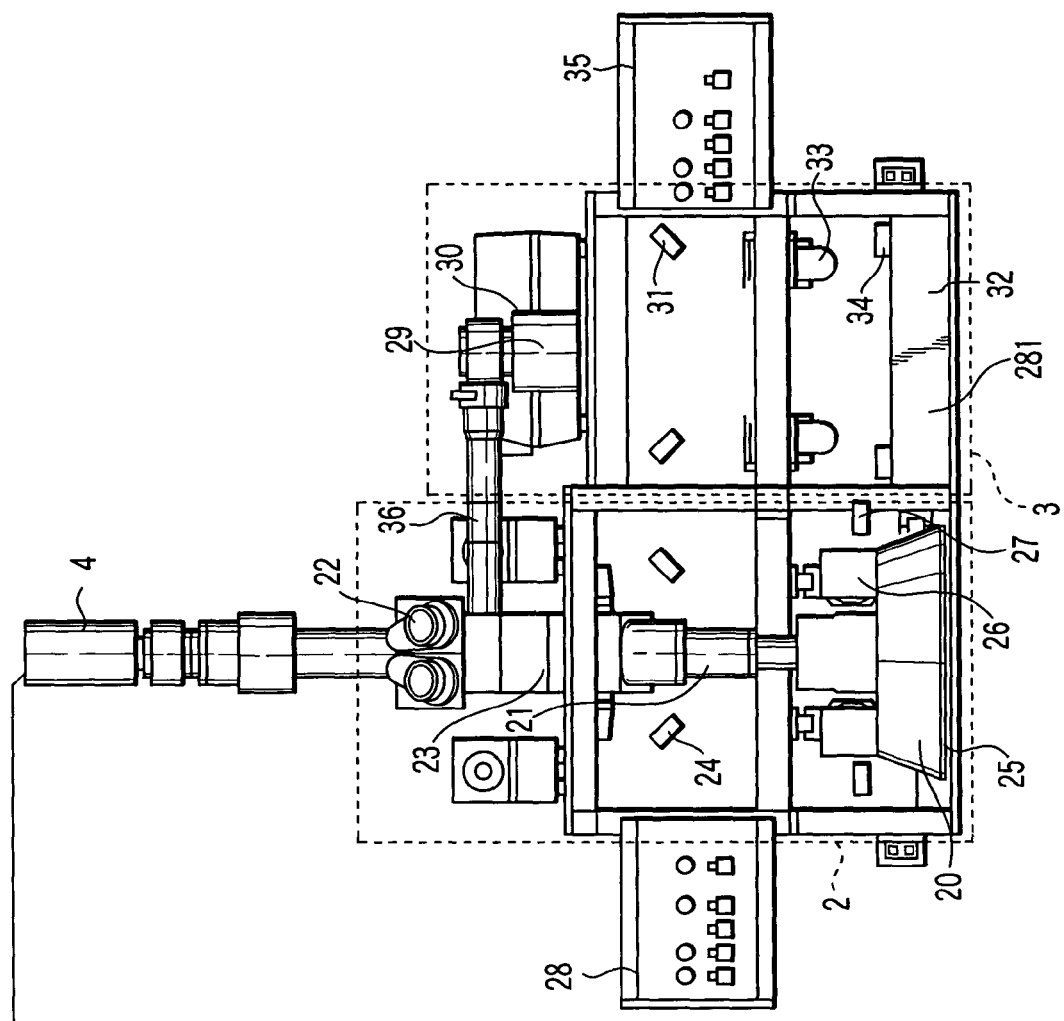
FIG. 3 is a view showing the system arrangement of the microscopic image comparison apparatus according to the first embodiment.
Figure 3:
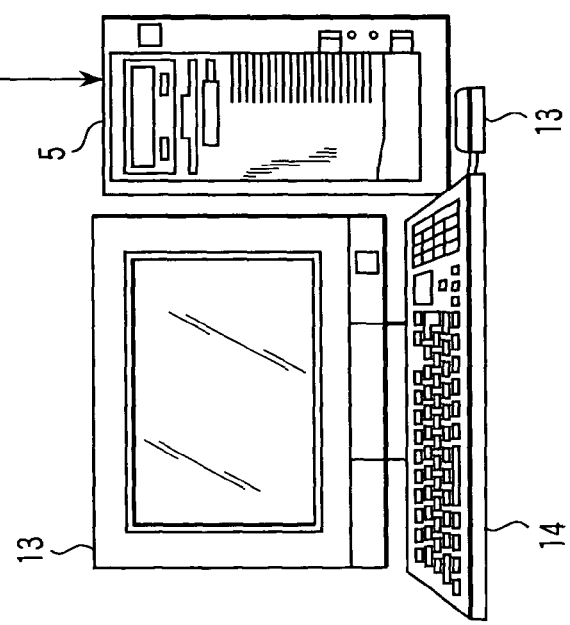

FIG. 3 is a view showing the system arrangement of the microscopic image comparison apparatus in FIG. 2. The same reference numerals as in FIG. 3 denote the same parts in FIG. 2.

Referring to FIG. 3, the micro-observation unit 2 is used as a micro-observation image capturing means for observation of elaborate printing and treatment of a specimen upon enlarging it. The micro-observation unit 2 has an object lens 21 opposed to the specimen (not shown) placed on a base 20. An elaborate printing or treatment state of the specimen is enlarged through the object lens 21 and can be visually observed through an eyepiece 22. This state is sensed by the TV camera 4 and captured into the personal computer body 5.

The micro-observation unit 2 includes a polarization illumination source 23, epi-illumination source 24, transmitted illumination source 25, epi-fluorescence illumination source 26, and focal illumination source 27. The polarization illumination source 23 irradiates the specimen placed on the base 20 with polarized illumination light along the optical axis through the object lens 21. The epi-illumination source 24 is so placed as to irradiate the specimen with light from a position located outside the optical axis of the object lens 21. The transmitted illumination source 25 emits light from the inside of the base 20 toward the object lens 21 to allow observation of the outer shape of the specimen or an image transmitted through the specimen. The epi-fluorescence illumination source 26 is an illumination source for observation of a fluorescent image. This illumination source makes it possible to observe a special print obtained by applying fluorescent printing to the specimen. The focal illumination source 27 is placed at a position where the specimen can be obliquely illuminated with light. This illumination source is used to observe special treatment of producing an embossed pattern on the specimen, e.g., imprinting on the specimen.

A micro control box 28 is used to turn on/off the polarization illumination source 23, epi-illumination source 24, transmitted illumination source 25, epi-fluorescence illumination source 26, and focal illumination source 27 and adjust their brightness.

The macro-observation unit 3 is used as a macro-observation image capturing means for observing the specimen in a relatively wide visual field and range. The macro-observation unit 3 has a macrolens 29 opposed to the specimen (not shown) placed on a base 281. An image of the specimen is guided to the optical path on the micro-observation unit 2 side through the macrolens 29 and a macro focusing handle 36. The image of the specimen guided to the optical path on the micro-observation unit 2 side can be visually observed through the eyepiece 22. This image is also sensed by the TV camera 4 and captured in the personal computer body 5.

The macro-observation unit 3 includes, as illumination devices, a polarization illumination source 30, epi-illumination source 31, transmitted illumination source 32, epi-fluorescence illumination source 33, and focal illumination source 34. The polarization illumination source 30 irradiates the specimen placed on the base 281 with polarized illumination light along the optical axis through the macrolens 29. The epi-illumination source 31 is so placed as to irradiate the specimen with light from a position located outside the optical axis of the macrolens 29. The transmitted illumination source 32 emits light from the inside of the base 281 toward the macrolens 29 to allow observation of the outer shape of the specimen or an image transmitted through the specimen. The epi-fluorescence illumination source 33 is an illumination source for observation of a fluorescent image. This illumination source makes it possible to observe a special print obtained by applying fluorescent printing to the specimen. The focal illumination source 34 is placed at a position where the specimen can be obliquely illuminated with light. This illumination source is used to observe special treatment of producing an embossed pattern on the specimen, e.g., imprinting on the specimen.

A macro control box 35 is used to turn on/off the polarization illumination source 30, epi-illumination source 31, transmitted illumination source 32, epi-fluorescence illumination source 33, and focal illumination source 34 and adjust their brightness.

Figure 4:
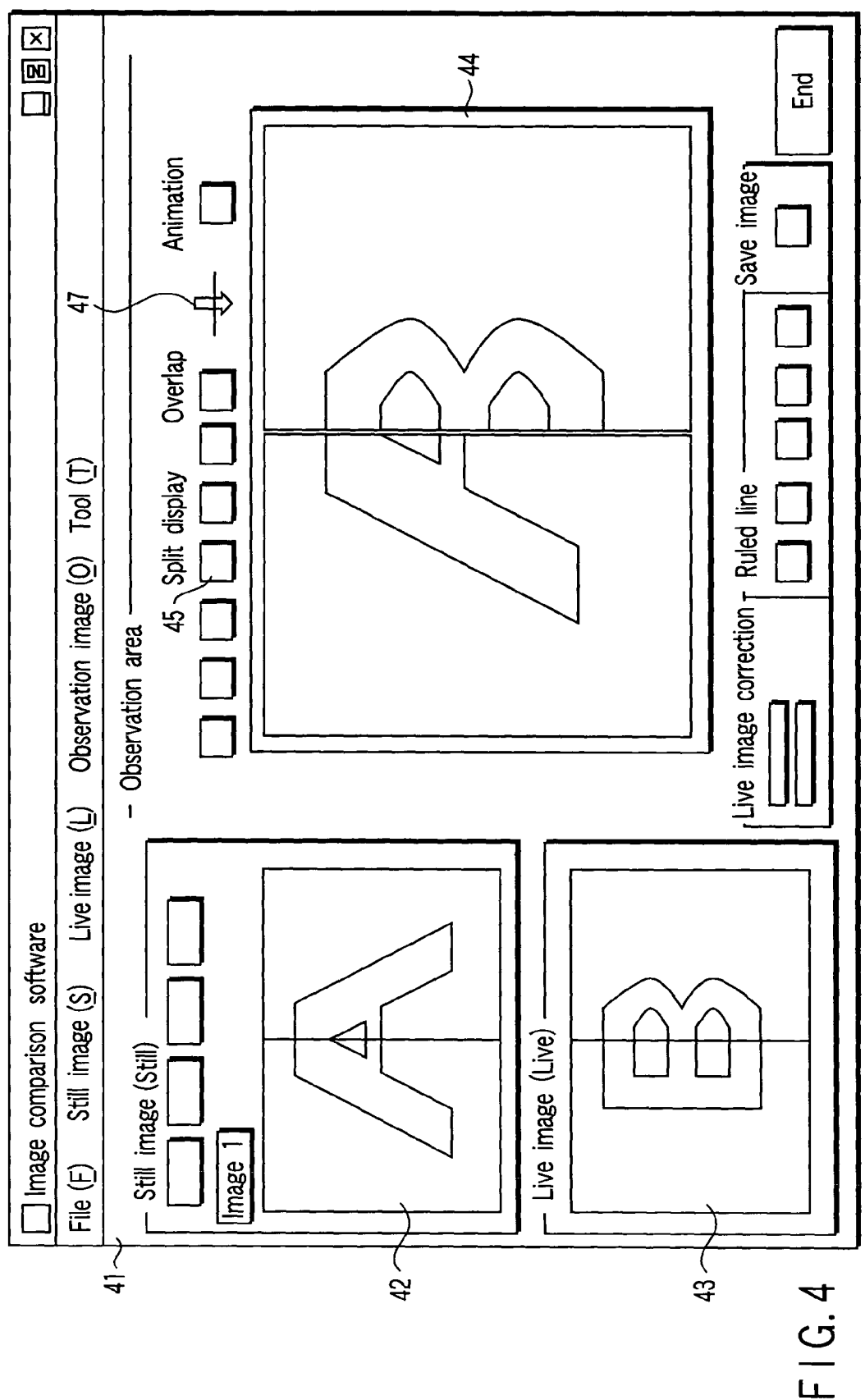
FIG. 4 is a view showing a display example on a monitor used in the first embodiment.

FIG. 4 shows an example of a GUI (Graphical User Interface) 41 displayed when the image comparison software of the program 10a recorded on the recording medium 10 is activated. For example, the GUI 41 is displayed as a Windows dialog using an operation system such as Windows of Microsoft.

The GUI 41 has a still image display area 42 serving as the first image display area and a live image display area 43 serving as the second image display area. A digital image as a still image can be displayed as a reference image in the still image display area 42. In this case, the reference image may be an image obtained by photographing a text letter or a counterfeit portion of a print specimen, or an image obtained by photographing, with the TV camera 4, a micro-observation image or macro-observation image of the specimen captured by the micro-observation unit 2 or macro-observation unit 3. These reference images are recorded in advance on the recording medium 10 of the personal computer body 5. A live image serving as a comparison image can be displayed in the live image display area 43. A comparison image is an image of a specimen with which the user wants to compare a reference image (or which is to be compared with the reference image). The comparison image is a live image (or still image) obtained by photographing, with the TV camera 4, the micro-observation image or macro-observation image of the specimen which is captured by the micro-observation unit 2 or macro-observation unit 3. In this case, an image which is photographed by the TV camera 4 to obtain a comparison image may be an image obtained from either the micro-observation unit 2 or the macro-observation unit 3. The observer can arbitrarily select one of these images which is to be observed, in accordance with a purpose. The live image display area 43 allows a live image to be displayed. However, after the specimen is moved and its observation position is determined, the image in this area can also be temporarily displayed as a still image.

The GUI 41 has an observation image display area 44 as the third image display area. In the observation image display area 44, the still and live images displayed in the still image display area 42 and live image display area 43 can be displayed by various display methods to be described below.

FIGS. 5A to 10C are views for explaining various display examples in the observation image display area 44.

Figure 5A:
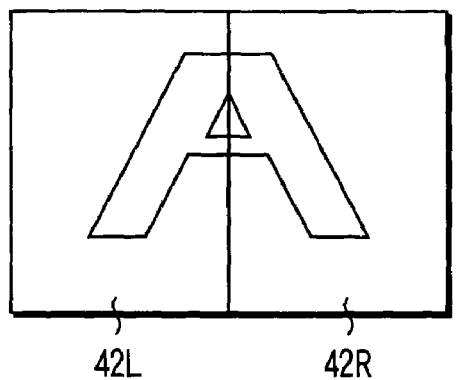
FIGS. 5A to 5F are views showing the first display example for comparison between a reference image and a comparison image in the first embodiment.
Figure 5B:
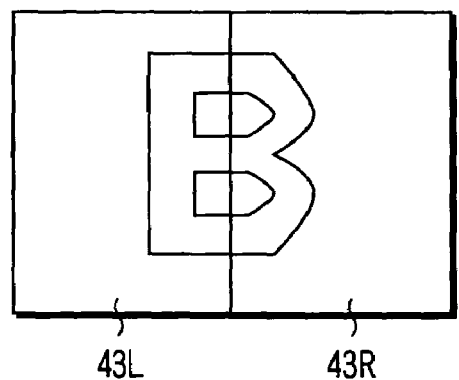

FIGS. 5A to 5F show the first display example in a case wherein the reference image in the still image display area 42 and the comparison image in the live image display area 43 are placed side by side in the observation image display area 44. FIG. 5A is a view showing the reference image in the still image display area 42. The left half of this image is a left still image portion 42L, and the right half is a right still image portion 42R. FIG. 5B is a view showing the comparison image in the live image display area 43. The left half of this image is a left live image portion 43L, and the right half is a right live image portion 43R.

Figure 5C:
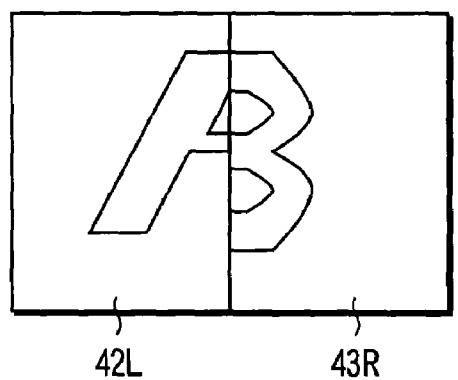
Figure 5D:
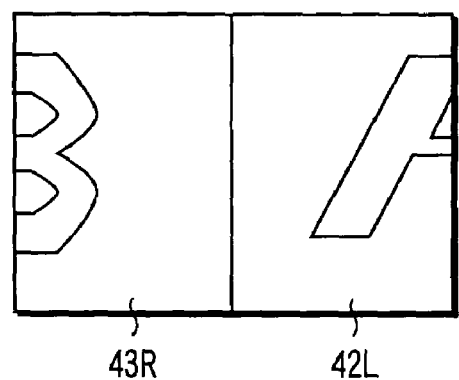
Figure 5E:
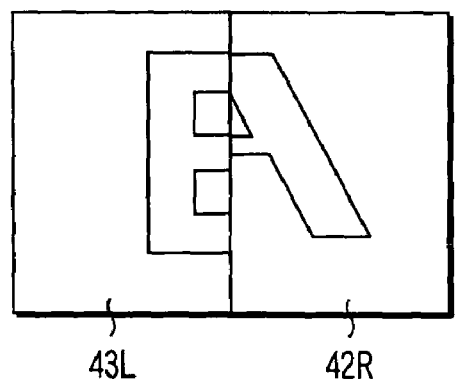
Figure 5F:
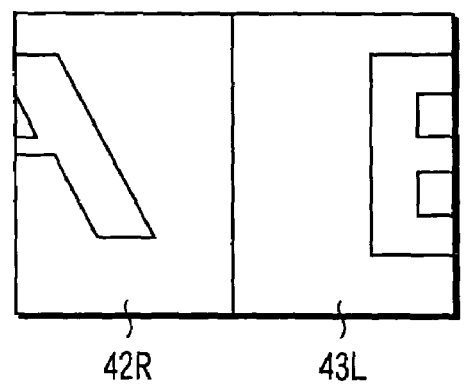

FIG. 5C is a view showing an observation image in the observation image display area 44. A reference image of the left still image portion 42L is displayed as the left half of the observation image, and a comparison image of the right live image portion 43R is displayed as the right half of the observation image. Likewise, referring to FIG. 5D, a comparison image of the right live image portion 43R is displayed in the left half of the area, and a comparison image of the right live image portion 43R is displayed in the right half of the area. Likewise, referring to FIG. 5D, a comparison image of the right live image portion 43R is displayed in the left half of the area, and a reference image of the left still image portion 42L is displayed in the right half of the area. Likewise, referring to FIG. 5E, a comparison image of the left live image portion 43L is displayed in the left half of the area, and a reference image of the right still image portion 42R is displayed in the right half of the area. Likewise, referring to FIG. 5F, a reference image of the right still image portion 42R is displayed in the left half of the area, and a comparison image of the left live image portion 43L is displayed in the right half of the area. In this case, as the left live image portion 43L and right live image portion 43R, images photographed by the TV camera 4 are displayed in real time (at the video rate). This allows the observer to adjust the left still image portion 42L or right still image portion 42R to a desired observation position while moving the specimen. When the observation image is completely positioned, the left and right images can be compared as still images.

Referring to FIGS. 5A to 5F, the window is split into left and right portions at the same ratio. However, this ratio can be changed. For example, referring to FIG. 5C, the width of the left still image portion 42L may be decreased, and the width of the right live image portion 43R may be increased.

Displaying a reference image and comparison image side by side in this manner helps the observer to visually find the difference between an original and a counterfeit print.

Figure 6A:
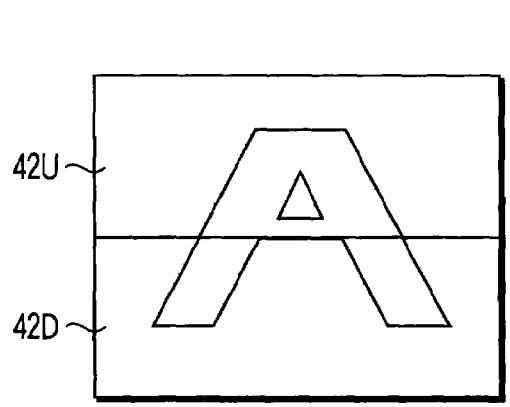
FIGS. 6A to 6F are views showing the second display example for comparison between a reference image and a comparison image according to the first aspect.
Figure 6B:
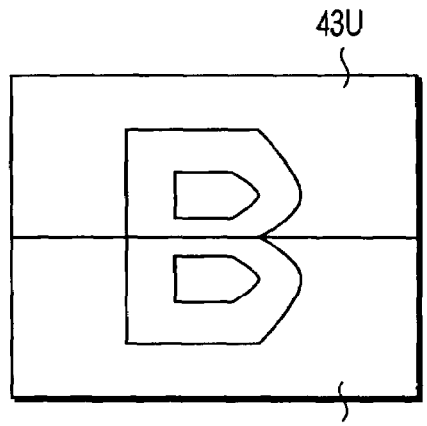

FIGS. 6A to 6F show the second display example in a case wherein a reference image in the still image display area 42 and a comparison image in the live image display area 43 are vertically arranged in the observation image display area 44 to be compared with each other. FIG. 6A shows the reference image in the still image display area 42. The upper and lower halves of this image are an upper still image portion 42U and lower still image portion 42D, respectively. FIG. 6B shows the comparison image in the live image display area 43. The upper and lower halves of this image are an upper live image portion 43U and lower live image portion 43D, respectively.

Figure 6C:
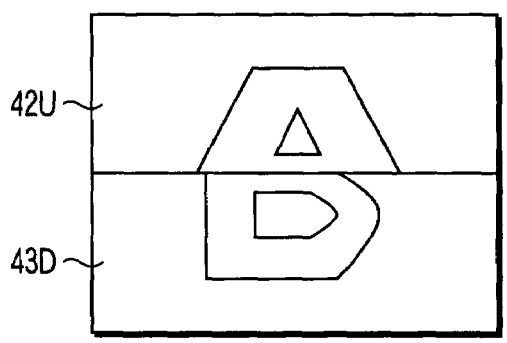
Figure 6D:
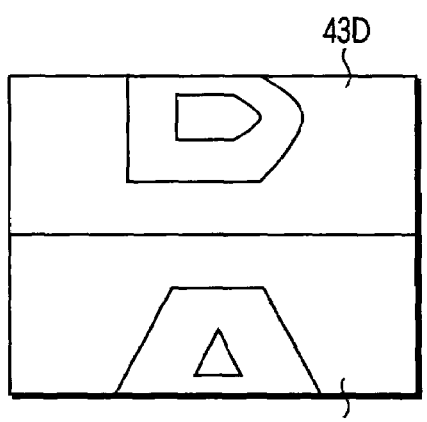
Figure 6E:
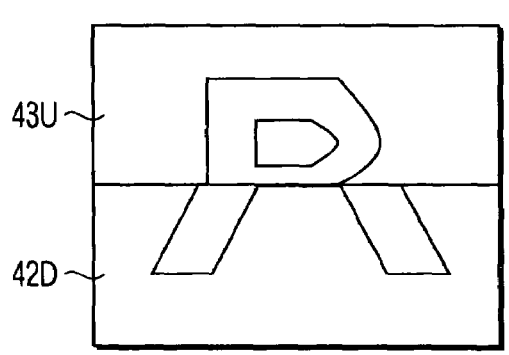
Figure 6F:
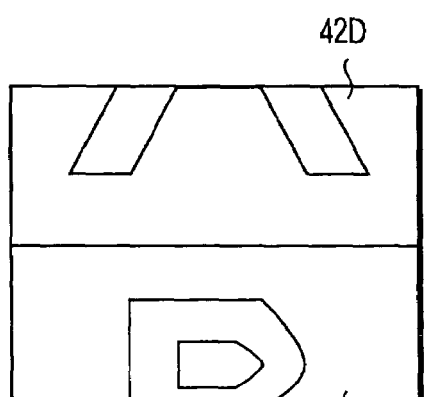

FIG. 6C shows the observation image in the observation image display area 44. The upper half of the observation image is displayed as a reference image of the upper still image portion 42U; and the lower half, as a comparison image of the lower live image portion 43D. Likewise, referring to FIG. 6D, the upper half is displayed as a comparison image of the lower live image portion 43D; and the lower half, as a reference image of the upper still image portion 42U. Referring to FIG. 6E, the upper half is displayed as a comparison image of the upper live image portion 43U; and the lower half, as a reference image of the lower still image portion 42D. Referring to FIG. 6F, the upper half is displayed as a reference image of the lower still image portion 42D; and the lower half, as a comparison image of the upper live image portion 43U. In this case as well, as the upper live image portion 43U and lower live image portion 43D, the images photographed by the TV camera 4 are displayed in real time (at the video rate). This allows the observer to adjust the upper still image portion 42U or lower still image portion 42D to a desired observation position while moving the specimen. When the observation image is completely positioned, the left and right images can be temporarily compared as still images.

The widows shown in FIGS. 5A to 5F and FIGS. 6A to 6F can be easily switched by clicking a "split display" icon 45 on the GUI 41.

Displaying a reference image and comparison image upon vertically arranging them in this manner as well helps the observer to, for example, visually find the difference between an original and a counterfeit print.

Figure 7A:
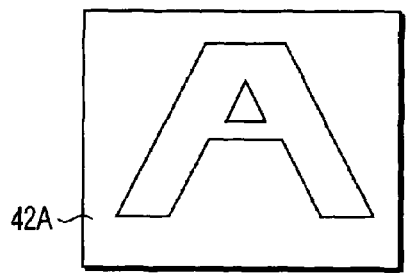
FIGS. 7A to 7D are views showing the third display example for comparison between a reference image and a comparison image according to the first embodiment.
Figure 7B:
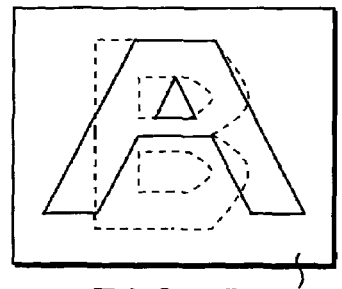
Figure 7C:
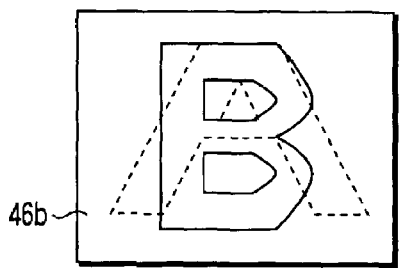
Figure 7D:
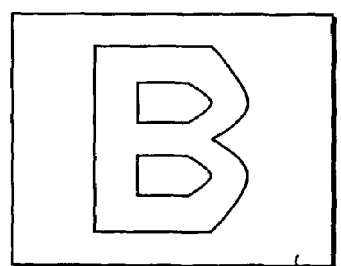

FIGS. 7A to 7D show the third display example showing a method in a case wherein a reference image in the still image display area 42 and a comparison image in the live image display area 43 are overlapped (image addition) in the observation image display area 44 to be compared with each other. FIG. 7A shows an observation image in the observation image display area 44. Referring to FIG. 7A, only a still image 42A which is a reference image in the still image display area 42 is displayed. FIG. 7B shows an example of an overlap image 46a. A live image 43B (see FIG. 7D) which is a comparison image in the live image display area 43 is displayed upon being superimposed on the still image 42A at a predetermined ratio (this processing will be referred to as "overlap processing" hereinafter). Assume that two images (e.g., images "A" and "B") are added. In this case, letting Ia(x, y) be the luminance of a given pixel (when the pixel position is represented by (x, y) of the image "A", and Ib(x, y) be the luminance of a pixel of the image "B" at the same position, a luminance I(x, y) of the overlap image can be obtained by $$I(x, y) = Ia(x, y) \times m + Ib(x, y) \times n$$

for $m = 1 - n$; ($0 \leq m, n \leq 1$).

The images are added by performing this calculation for all the pixels. Referring to the overlap image 46a in FIG. 7B, since the ratio of the still image 42A is larger than that of the live image 43B, the still image 42A is seen more clearly. As the ratio of the still image 42A is decreased below that of the live image 43B, the live image 43B is seen more clearly than the still image 42A unlike the overlap image 46a shown in FIG. 7B. That is, as the ratio of the still image 42A is increased, only the still image 42A in FIG. 7A can be seen eventually. As the ratio of the live image 43B is increased, only the live image 43B in FIG. 7D can be seen eventually.

Figure 8:
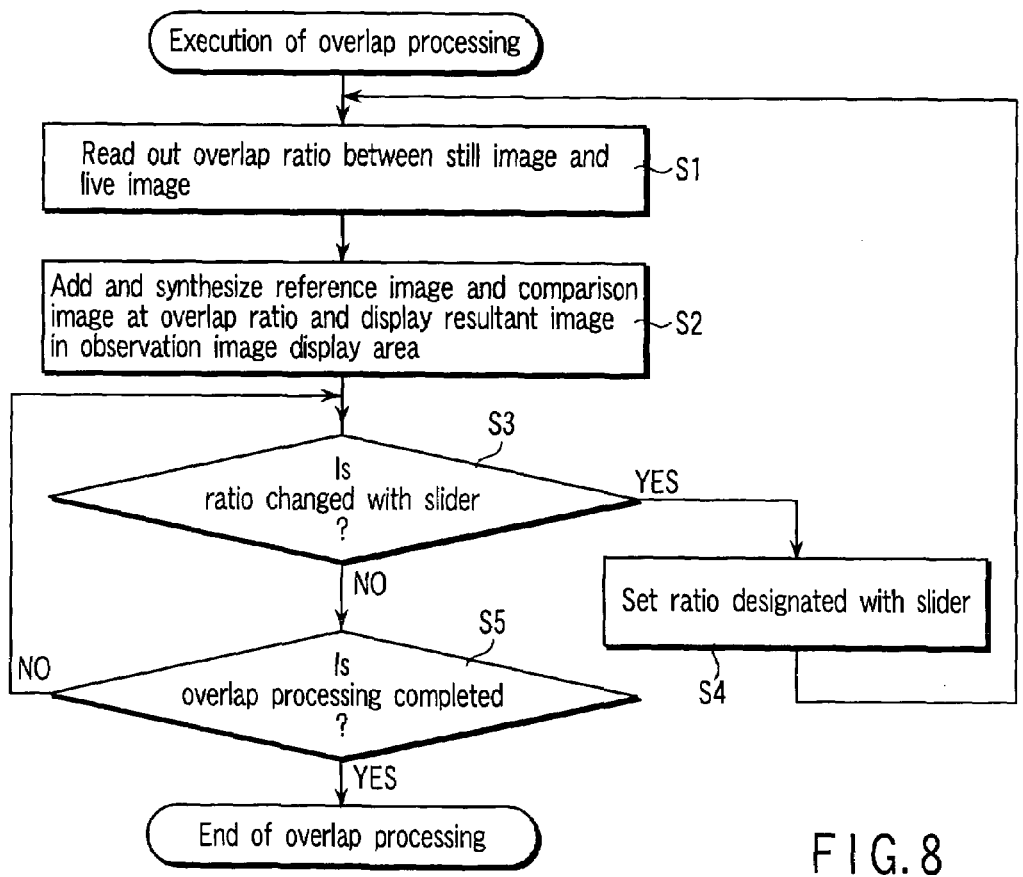
FIG. 8 is a flow chart for explaining overlap processing in the first embodiment.

The above overlap processing will be described with reference to the flow chart shown in FIG. 8.

In step S1, the overlap ratio (the default value or previously set value) between the still image 42A and the live image 43B is read out from the recording medium 10. This overlap ratio corresponds to the ratio between m and n in the above equation. Note that the operator can easily adjust the overlap ratio by moving a slider 47 on the GUI 41 shown in FIG. 4. In step S2, the still image 42A and live image 43B are added and synthesized at the read overlap ratio, and the resultant image is displayed in the observation image display area 44. In this case, calculation of a ratio is performed for all the pixels of the images according to the above equation. It is then checked in step S3 whether or not the overlap ratio is changed with the slider. If the overlap ratio is changed with the slider 47, the value designated with the slider 47 is set again as an overlap ratio stored in the RAM 8 or recording medium 10 in step S4.

The flow then returns to step S1 to repeat the same processing.

If it is determined in step S3 that the overlap ratio is not changed, the flow advances to step S5 to check whether the overlap processing is to be terminated. If the overlap processing is not terminated, the flow returns to step S3 to repeat the same processing. If the overlap processing is to be terminated, a series of operations in the overlap processing is terminated.

In the above manner, overlap display is performed by adding and overlapping a reference image and comparison image, e.g., an original and a counterfeit print, thereby helping the observer to visually find the difference between them.

Figure 9:
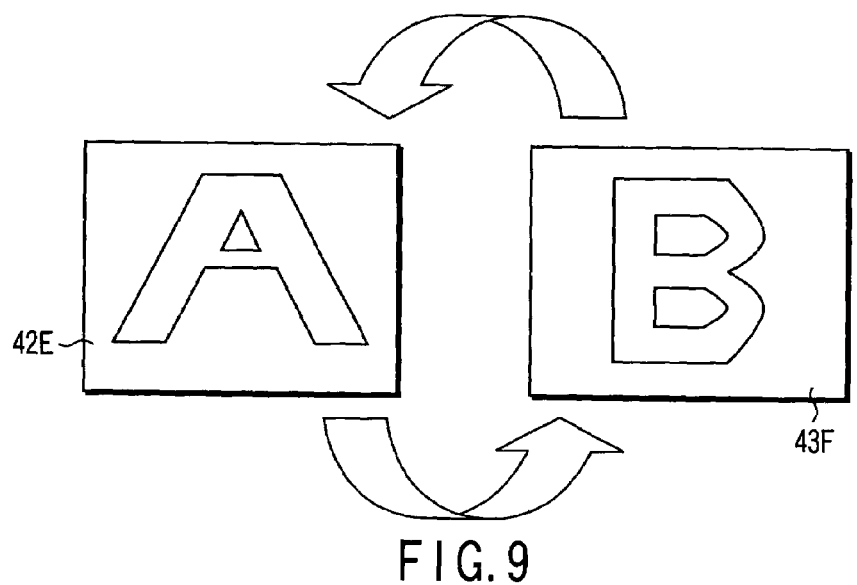
FIG. 9 is a view showing the fourth display example for comparison between a reference image and a comparison image in the first embodiment.

FIG. 9 shows the fourth display example in a case wherein a reference image in the still image display area 42 and a comparison image in the live image display area 43 are alternately switched and displayed in the observation image display area 44 at predetermined time intervals to be compared with each other.

In this case, first of all, the reference image displayed in the still image display area 42 is displayed as a still image 42E in the observation image display area 44. After a lapse of a predetermined period of time, the comparison image displayed in the live image display area 43 is displayed as a live image 43F in the observation image display area 44. After a lapse of a predetermined period of time, the still image 42E is displayed. Such processing is continuously executed. A program for this image switching/display processing can be executed by clicking a predetermined icon on the GUI 41. The image switching time can be changed to an arbitrary value by inputting a predetermined time interval through the GUI 41, as described above.

Using the persistence of vision by alternately switching and displaying two images at predetermined time intervals as in animation in this manner helps the observer to, for example, visually find the difference between an original and a counterfeit document.

Figures 10A, 10B, 10C:
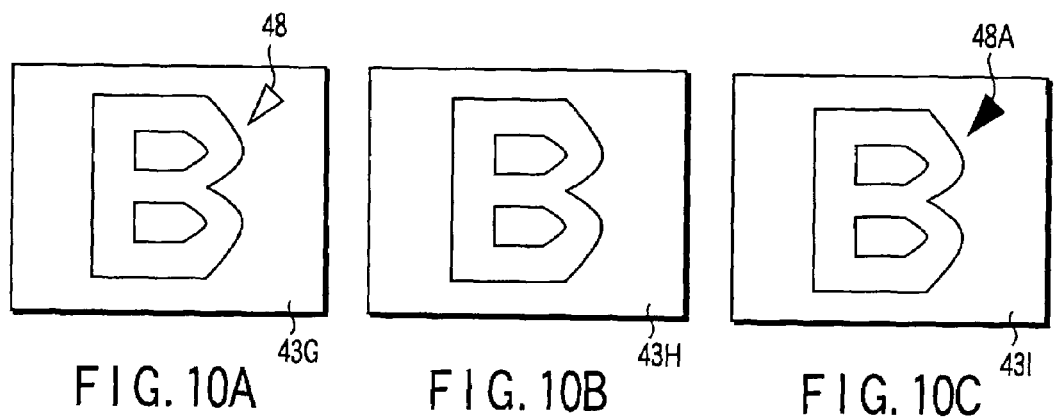
FIGS. 10A to 10C are views showing the fifth display example for comparison between a reference image and a comparison image in the first embodiment.

FIGS. 10A to 10C show the fifth display example in a case wherein different portions of a reference image in the still image display area 42 and a comparison image in the live image display area 43 are highlighted.

An outline of an automatic different portion detection method of detecting a difference portion between a reference image and a comparison image will be described. A different portion is detected by the automatic different portion detection method in the following manner. A still image 43G displayed in the still image display area 42 is compared with a live image 43H displayed in the live image display area 43. On the basis of the comparison result, the different portion is highlighted as a different-portion-emphasized image 43I in the observation image display area 44.

For example, a different portion is automatically detected by subtraction between a reference image and a comparison image. For example, letting Ib(x, y) be the luminance of a given pixel of an image "B", and Ib'(x, y) be the luminance of a pixel of an image "B'" at the same position, a luminance I(x, y) of an image obtained by subtraction can be given by $$I(x, y) = |Ib(x, y) - Ib'(x, y)|$$

In this case, if the luminance I is higher than 0, the corresponding pixels differ from each other. In consideration of noise and the like, however, a threshold may be set so that when the luminance is equal to or more than a predetermined value (e.g., 50), it is determined that the corresponding pixels differ from each other. Image subtraction can be done by performing this calculation for all the pixels. FIG. 10C shows the different-portion-emphasized image 43I in which the different portion between the images in FIGS. 10A and 10B is highlighted. According to this different-portion-emphasized image, since an area 48 of the still image 43G in FIG. 10A differs from the corresponding portion of the live image 43H in FIG. 10B, the area 48 can be obtained as a different portion 48A. As shown in FIG. 10C, in the different-portion-emphasized image 43I, the area 48A may be highlighted with a color or graphic pattern so as to be displayed as the area 48A. Alternatively, in the different-portion-emphasized image 43I, only the different area 48A may be displayed, or the different area may be superimposed and displayed on the still image 43G, the live image 43H, or an image obtained by overlapping the still and live images. The ratio of the number of pixels that differ in luminance to the number of pixels of the entire image is obtained. The difference between the images can then be evaluated by regarding the obtained ratio as the degree of coincidence between the images.

The different portion between the still image 43G and the live image 43H is highlighted (automatically or manually) to allow the operator to easily grasp the different portion between the two images. This also makes it possible to automatically determine the presence/absence of a different portion. Therefore, this can prevent variations among operators.

Measures against lack of brightness of the live image 43H will be described below. When an image lacks in brightness, illumination may be adjusted to increase the brightness of the image as described in FIG. 3. Even if, however, the intensity of illumination is maximized, the image may still be dark. When a fluorescent image is to be observed, in particular, the image becomes very dark. In such a case, integration processing is preferably performed with respect to the live image 43H. For example, this integration processing is performed as follows. Analog images photographed by the TV camera 4 shown in FIG. 2 are sequentially converted into digital images at the video rate by the image input board 6. The sequentially converted digital images are added when they are temporarily stored in a storage device (not shown) in the video card 7. The added digital images are sequentially displayed as the live image 43H on the personal computer monitor 13. In the integration processing, sequentially converted digital images are stored in the storage device while being added one by one. This makes it possible to increase the luminance of the image. In addition, as digital images are added, flickering noise pixels in an image are averaged to form a smooth image. That is, the noise in the image is reduced.

As described above, an observation image captured by the macro-observation unit 3 for capturing a macroscopic observation image of a specimen or the micro-observation unit 2 for capturing a microscopic observation image of a specimen is photographed by the TV camera 4. A comparison image formed from the photographed observation image and a reference image prepared in advance are displayed on the personal computer monitor 13 by various display methods so as to be compared with each other. This makes it possible to easily and efficiently compare and observe a specimen, e.g., special printing on printed matter or ID card.

In addition, various kinds of illumination methods can be selectively used in accordance with specimens. This helps the observer to visually observe a print or treatment which is difficult to see, thereby realizing high-precision image comparison.

Photographing conditions and the like set when a reference image is captured are preferably stored. Since this allows a comparison image to be captured under the same photographing conditions, there is no sense of congruity between the images to be compared with each other. Therefore, high-precision image comparison can be done.

Furthermore, since a mode suitable for specimens to be compared can be selected from a plurality of image comparison modes (e.g., the first to fifth display examples), image comparison can be performed under optimal conditions.

Moreover, for example, as in the fifth display example, a different portion between two images can be highlighted with a color or mark on an image display to attract the attention of the observer. This facilitates visual recognition of the difference between the images.

In the first embodiment, printed matter or the like has been described as a specimen. However, a specimen is not limited to printed matter and includes anything that can be stored as a digital image, e.g., a virus or organic cell that can be observed with a microscope.

Second Embodiment

The second embodiment of the present invention will be described with reference to FIG. 11.

The apparatus arrangement and GUI in the second embodiment are the same as those described in the first embodiment with reference to FIGS. 2, 3, and 4, and hence a description thereof will be omitted.

Figure 11:
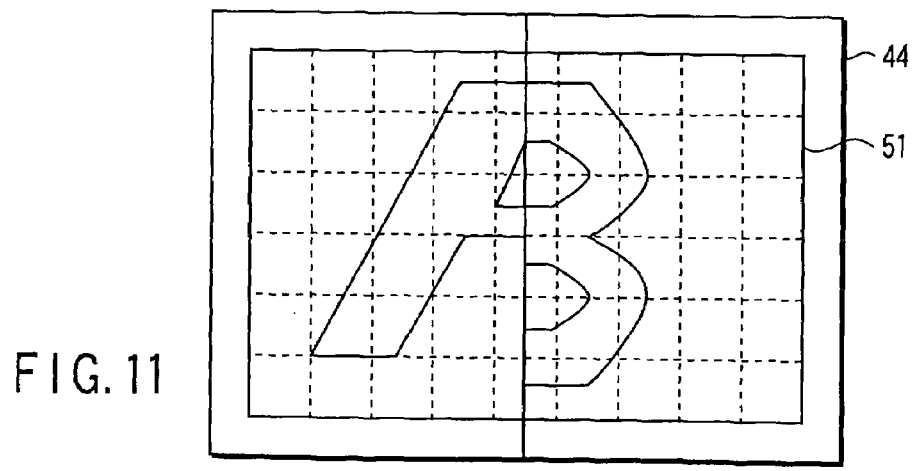
FIG. 11 is a view showing a display example for comparison between a reference image and a comparison image in the second embodiment of the present invention.

FIG. 11 shows an observation image displayed in an observation image display area 44 of a GUI 41 in FIG. 4. Referring to FIG. 11, a lattice 51 with a predetermined spacing is displayed on the observation image in the observation image display area 44. The lattice 51 may have a 9×6 matrix as shown in FIG. 11 and can be arbitrarily changed to, for example, a 2×2 matrix. With this arrangement, when a reference image in a still image display area 42 and a comparison image in a live image display area 43, which are described in the first embodiment, are displayed side by side, graphic patterns of the two images which are to be compared, the sizes of printed characters, positional relationships, and the like can be visually compared with each other easily. This allows the observer to easily find the difference between the two images.

Third Embodiment

The third embodiment of the present invention will be described with reference to FIG. 12.

When the above microscopic image comparison apparatus is used on a standalone basis, an image or information about a counterfeit print or the like as a specimen can be used in only this apparatus. Even if, therefore, for example, suspicious objects such as counterfeit prints are found in different places, e.g., various regions, it cannot be checked whether or not they are identical counterfeit prints. In addition, an image of an original print or the like must be captured in advance as a digital image in each microscopic image comparison apparatus by carrying an original specimen to each region. Such operation must be performed for all the microscopic image comparison apparatuses, and hence it takes much time, resulting in poor operation efficiency.

In the third embodiment, therefore, a plurality of microscopic image comparison apparatuses are connected to each other through a network.

Assume that as a plurality of microscopic image comparison apparatuses, a microscopic image comparison apparatus A61 in Tokyo, a microscopic image comparison apparatus B62 in Osaka, and a microscopic image comparison apparatus C63 in Fukuoka are installed in the respective regions. Personal computer bodies 5 of the microscopic image comparison apparatus A61, microscopic image comparison apparatus B62, and microscopic image comparison apparatus C63 are connected to a network 64 through network interfaces (not shown). The network 64 can be a dedicated line such as an ISDN or the Internet. An image server 65 is connected to the network 64. The image server 65 can perform data communication with the microscopic image comparison apparatus A61, microscopic image comparison apparatus B62, and microscopic image comparison apparatus C63.

In the above arrangement, necessary digital images and associated information, e.g., a description of a counterfeit portion of a document, are stored in the image server 65 in advance. Assume that a thing suspected as a counterfeit is found in an Osaka region. In this case, an operator uses the personal computer body 5 of the microscopic image comparison apparatus B62 in Osaka to search the image server 65 for information about the thing suspected as the counterfeit and download necessary information through the network 64. The operator then performs image comparison.

Every time an image or information of a counterfeit is found in a region, the image or information is stored in the image server 65. This makes it possible to obtain information about the counterfeit in real time. In addition, when such new information is stored in the image server, the image sever may automatically send a message or the like to each of the microscopic image comparison apparatuses 61, 62, and 63 so as to allow an operator in each region to always receive the latest information.

As described above, when a plurality of microscopic image comparison apparatuses are installed in various regions, they are connected to each other through the network 64 and allowed to perform data communication using the image server 65. This allows a plurality of microscopic image comparison apparatuses to share image data and other information. This makes it possible to perform image comparison using the latest image data collected from various regions. Even if, therefore, things suspected as counterfeit prints or the like are found in various regions, for example, whether or not the things are identical counterfeits can be immediately checked by using the latest information about counterfeits found in other regions. That is, the operation efficiency can be greatly improved.

Note that the third embodiment has exemplified the case wherein image files and the like in the image server are shared through the network. The following arrangement using a network can also be used. An apparatus in each region is used to only photograph an image to be compared and select an image comparison method. These pieces of information are then communicated, through the network, to a control apparatus for centralized data processing. The control apparatus communicates a display window for image comparison to the apparatus in each region on the basis of the pieces of information. The apparatus in each region may perform image comparison on the basis of the photographed image and the image transmitted from the control apparatus.

Fourth Embodiment

The fourth embodiment of the present invention will be described with reference to FIG. 13.

In the first embodiment described above, a specimen on the base 281 is compared with a reference image in a wide visual field by using the macro-observation unit 3. The specimen is transferred onto the base 20 of the micro-observation unit 2 as needed to compare it with the reference image upon enlarging elaborate printing or treatment. In the fourth embodiment, these operations can be automatically performed.

Figure 13:
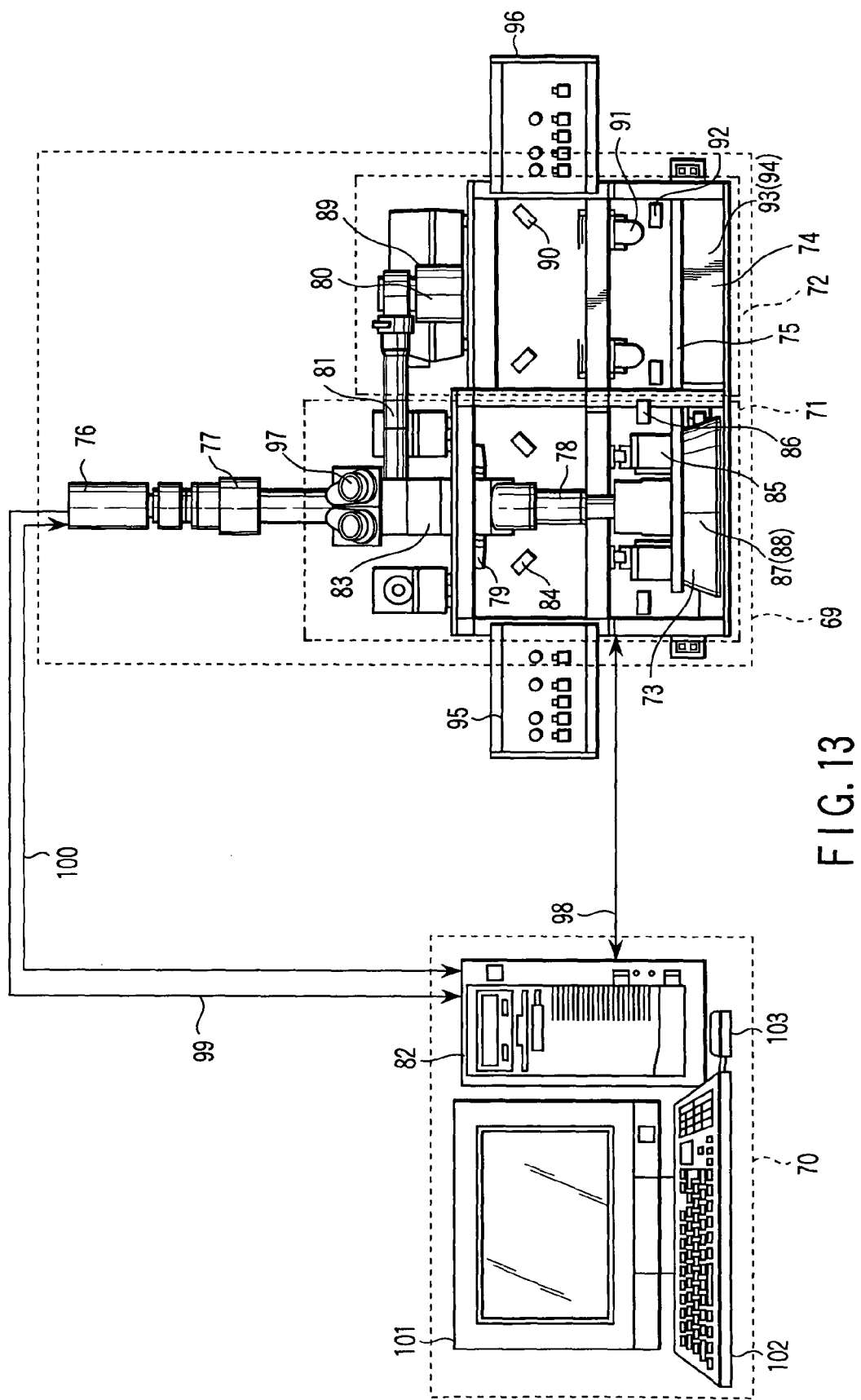
FIG. 13 is a view showing the system arrangement of a microscopic image comparison apparatus according to the fourth embodiment of the present invention.

FIG. 13 is a view showing the system arrangement of a microscopic image comparison apparatus according to the fourth embodiment.

Referring to FIG. 13, the microscopic image comparison apparatus includes an observation device 69 and image processing device 70.

The observation device 69 includes a micro-observation unit 71 serving as an integrated micro-observation image capturing means and a macro-observation unit 72 serving as a macro-observation image capturing means. The micro-observation unit 71 and macro-observation unit 72 have a common macro/micro motor-driven stage (automatic X-Y stage) 75 on a base (for micro observation) 73 and a base (for macro observation) 74. A specimen can be automatically transferred between the micro-observation unit 71 and the macro-observation unit 72 by driving the macro/micro motor-driven stage 75.

A TV camera 76 is provided for the micro-observation unit 71 and macro-observation unit 72 to photograph observation images in these units. In the micro-observation unit 71, the TV camera 76 photographs a specimen through a micro/macro zoom handle 77 and object lens 78. In this case, focus adjustment is performed by using a micro focusing handle 79. In the macro-observation unit 72, the TV camera 76 photographs a specimen through the micro/macro zoom handle 77, an optical path switching device (not shown), and a macrolens 80. In this case, focus adjustment is performed by using a macro focusing handle 81.

In this case, the micro focusing handles 79 and 81 of the micro-observation unit 71 and macro-observation unit 72, a dimmer (not shown), the optical path switching device (not shown), and the TV camera 76 can be automatically controlled by a personal computer body 82 serving as a control means which is a part of the image processing device 70.

The micro-observation unit 71 and macro-observation unit 72 have various kinds of illumination sources. The micro-observation unit 71 has a polarization illumination source 83, epi-illumination source 84, epi-fluorescence illumination source 85, focal illumination source 86, transmitted illumination source 87, and infrared transmitted illumination source 88. The macro-observation unit 72 has a polarization illumination source 89, epi-illumination source 90, epi-fluorescence illumination source 91, focal illumination source 92, transmitted illumination source 93, and infrared transmitted illumination source 94. These illumination devices are selected by the personal computer body 82, a micro control box (manual operation box) 95, and a macro control box (manual operation box) 96 in accordance with illumination methods suitable for the observation regions of specimens to be compared and the like.

Note that an eyepiece 97 is a lens for direct visual observation of an observation image of a specimen which is obtained by the micro-observation unit 71 or macro-observation unit 72.

The observation device 69 is connected to the image processing device 70 through a macro/micro communication cable 98, camera video cable 99, and TV camera communication cable 100.

In addition to the personal computer body 82, the image processing device 70 includes a personal computer monitor 101 serving as a display means for displaying an observation image, a GUI for control, and the like, and an keyboard 102 and mouse 103 as input devices. The image processing device 70 controls the observation device 69 through the macro/micro communication cable 98. The image processing device 70 captures a video signal from the TV camera 76 through the camera video cable 99. The image processing device 70 also controls the brightness, contrast, and the like of the TV camera 76 through the TV camera communication cable 100. That is, the image processing device 70 captures, in the video card 7, an image sensing signal from the TV camera 76 through the image input board 6 in the personal computer body 82, and displays the signal as a digital image on the personal computer monitor 101.

The personal computer monitor 101, keyboard 102, and mouse 103 are connected to the personal computer body 82. The personal computer monitor 101 displays a menu for system control, buttons, and images. The keyboard 102 and mouse 103 are used to operate the menu and buttons.

The personal computer body 82 has a frame memory function for displaying an image photographed by the TV camera 76, a menu/button operation function for system control, a communication function for controlling the observation device 69, and the like. The personal computer body 82 further includes a memory function for temporarily storing image data. The personal computer body 82 also includes a communication means (e.g., Ethernet, GP-IB, Parallel, and Serial) required to make other personal computers (servers, peripheral devices, or the like) store data such as an image photographed by the TV camera 76 and photographing conditions so as to share the data and to exchange data with other personal computers (servers, peripheral devices, or the like). In addition, the personal computer body 82 outputs, to the observation device 69 through interfaces, an instruction to drive the macro/micro motor-driven stage 75, focus, zoom, optical path switching, illumination method switching, and brightness control instructions, an instruction to control the TV camera 76, and the like. The interfaces are incorporated in the observation device 69 and personal computer body 82 and include, for example, RS-232C, GP-IB, Parallel, Serial, and SCSI.

The operation of the fourth embodiment having the above arrangement will be described with reference to FIGS. 14 to 17.

Figure 14:
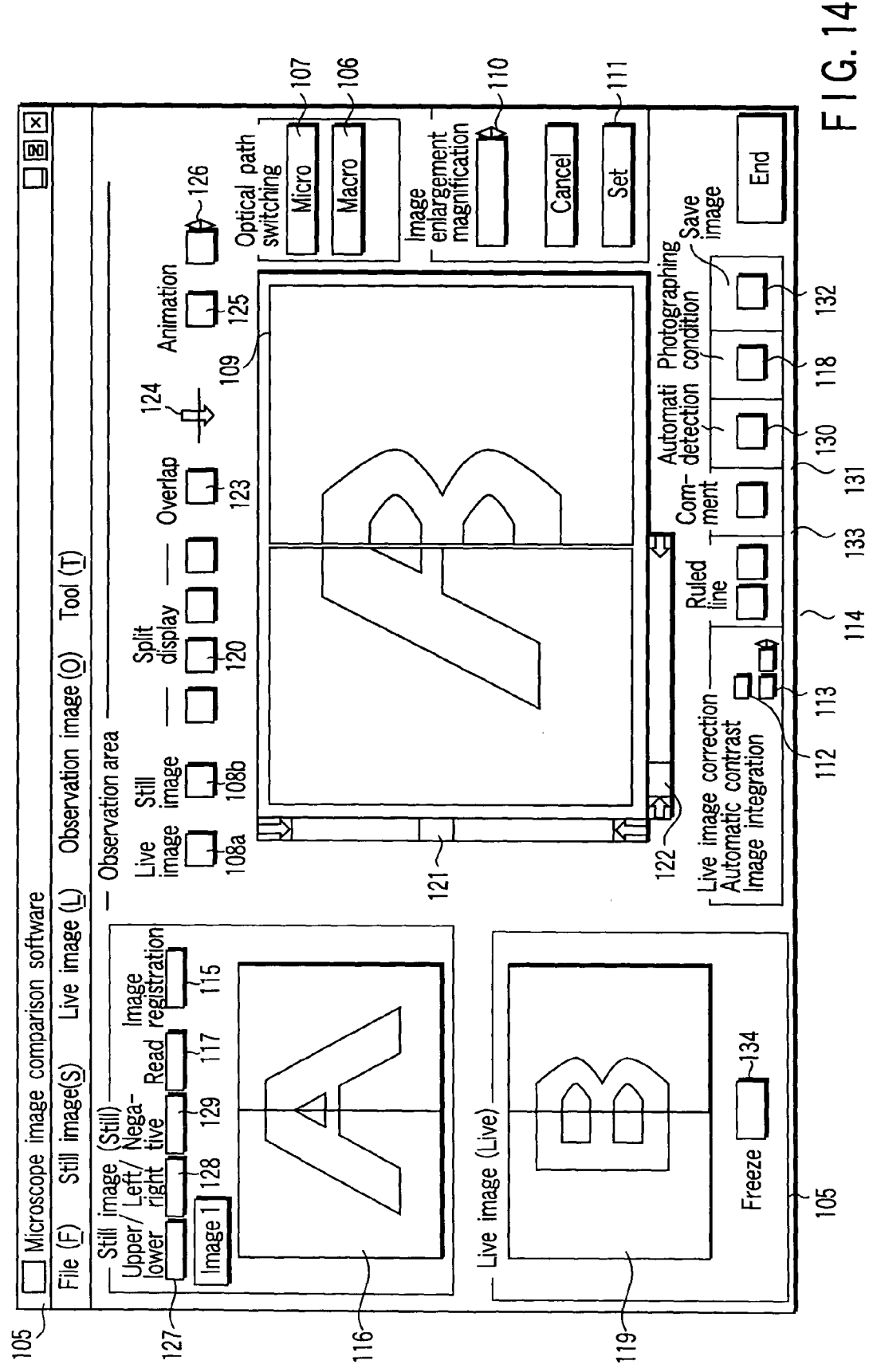
FIG. 14 is a view showing a display example on a monitor used in the fourth embodiment.
Figure 15:
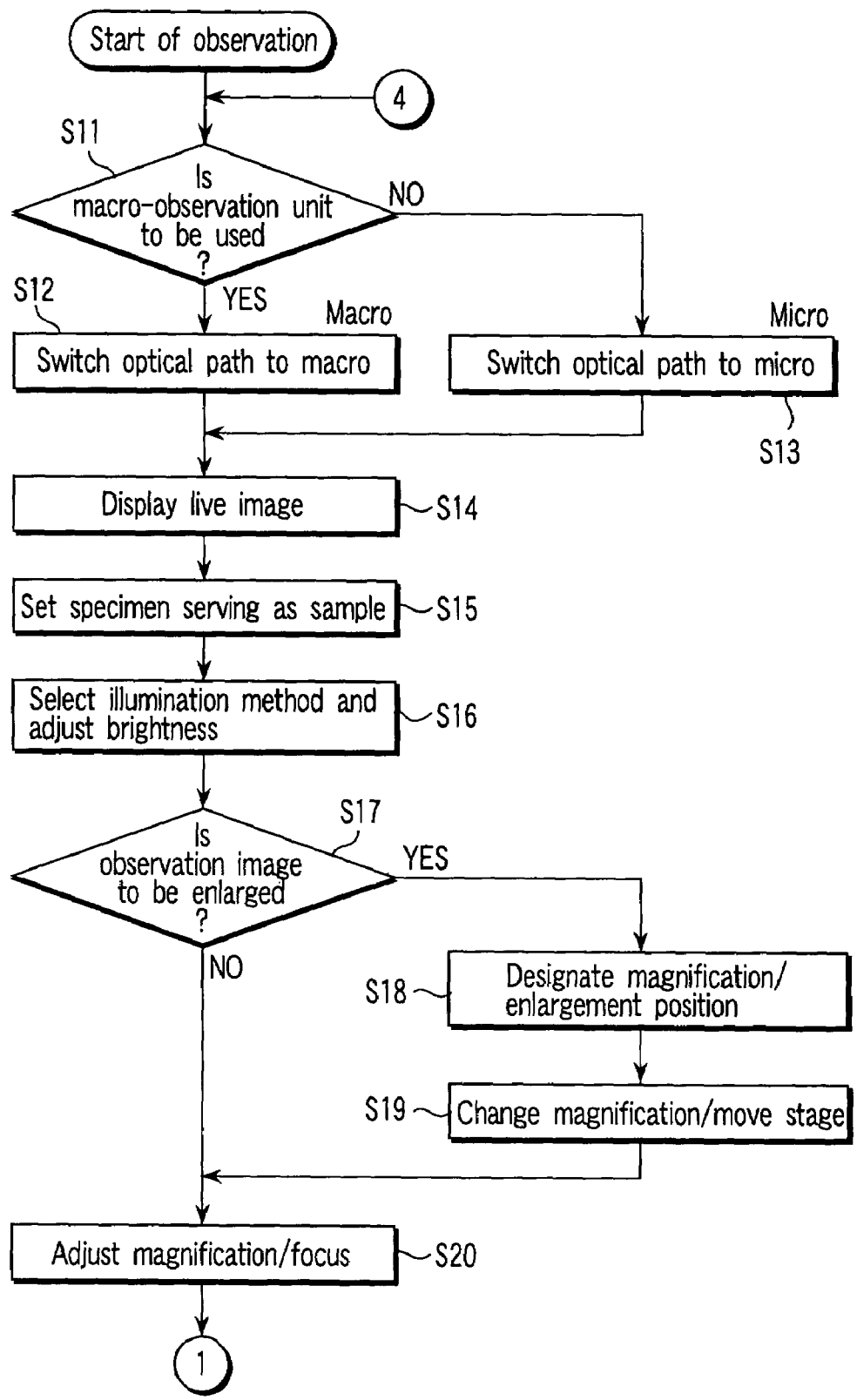
FIG. 15 is a flow chart for explaining the operation of the fourth embodiment.
Figure 16:
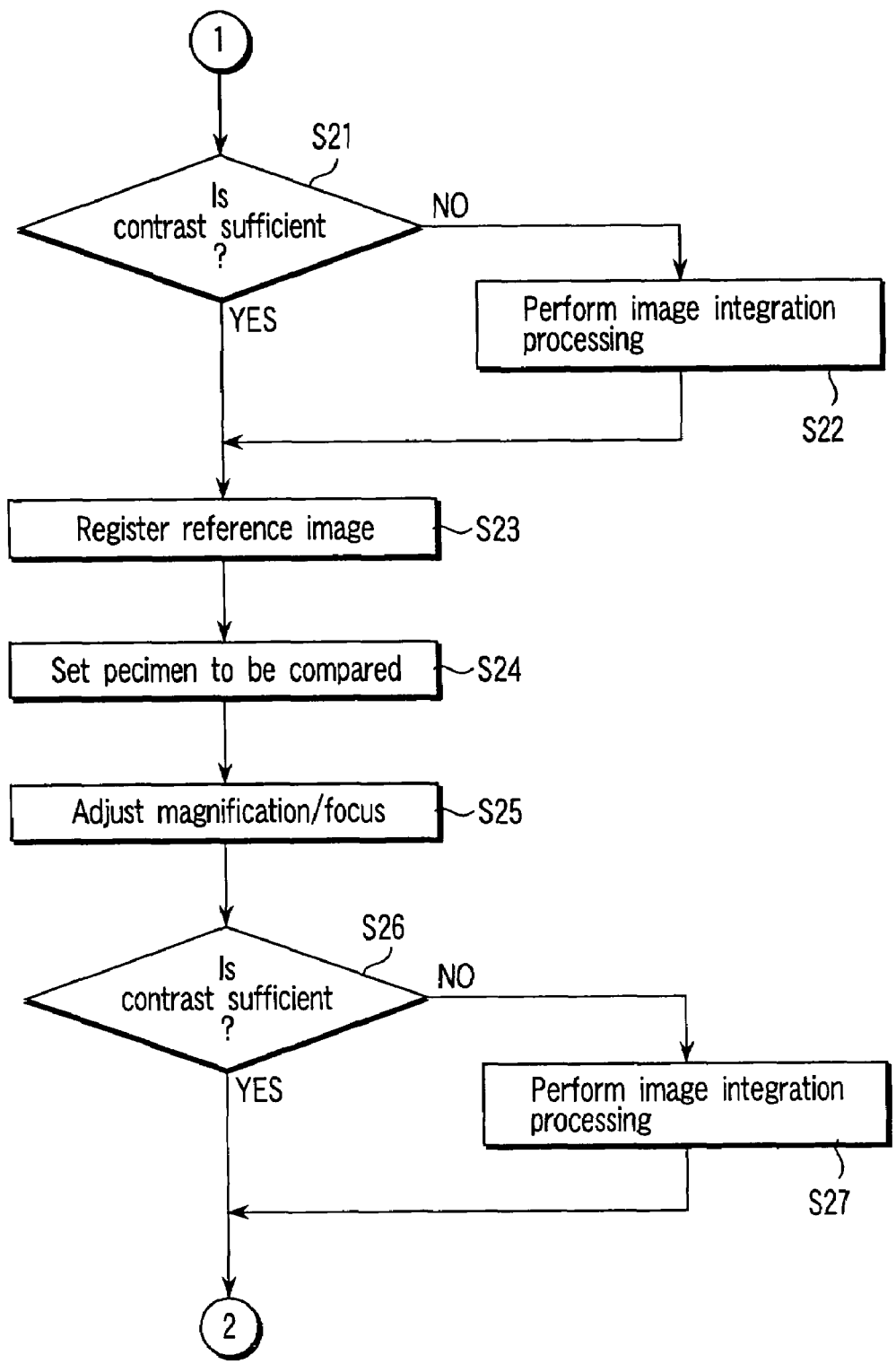
FIG. 16 is a flow chart for explaining the operation of the fourth embodiment.
Figure 17:
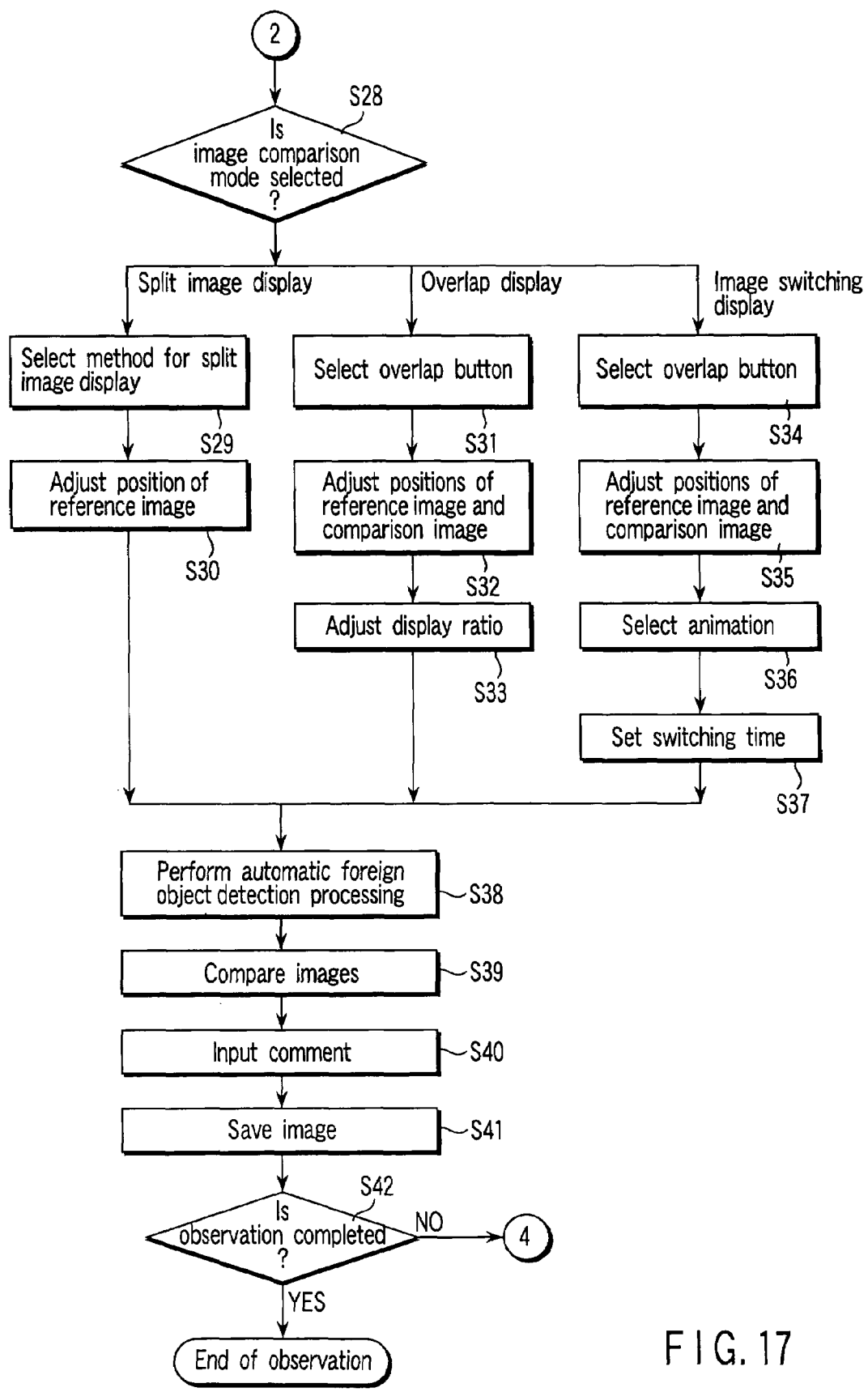
FIG. 17 is a flow chart for explaining the operation of the fourth embodiment.

FIG. 14 shows a display example on the personal computer monitor 101. FIGS. 15 to 17 are flow charts for explaining operation procedures and operation.

First of all, a reference image serving as a reference for image comparison is acquired and registered (steps S11 to S23 to be described later). In step S11 shown in FIG. 15, the observer selects an observation unit in the observation device 69. That is, the observer selects the macro-observation unit 72 or micro-observation unit 71 depending on the size of an observation area on a specimen or the like. In this case, the observer switches the optical paths by clicking a macro button 106 or micro button 107 corresponding to the macro-observation unit 72 or micro-observation unit 71 on an operation window 105 on the monitor shown in FIG. 14, thereby selecting a desired observation unit (steps S12 and S13). The observer then selects a live image button 108a on the operation window 105 on the monitor to display the live image photographed by the TV camera 76 in an observation image display area 109 (step S14). In this case, the image photographed by the TV camera 76 can be displayed as a still image in the observation image display area 109 by selecting a freeze button 134.

The observer then sets a specimen serving as a sample for generating a reference image on the macro/micro motor-driven stage 75 on the selected observation unit side (step S15). The observer selects an illumination source suitable for the specimen by using the macro control box 96 or micro control box 95 and adjusts the brightness while looking at the live image (observation image) displayed in the observation image display area 109 (step S16).

The observer determines whether to enlarge and observe a minute portion of the observation image (step S17). If the observer wants to enlarge the minute portion of the observation image (YES), he/she sets a magnification with a magnification change button 110. The observer then moves the pointer of the mouse 103 onto the observation image. As a consequence, a capture area with the magnification designated with the pointer is displayed on the observation image. The observer clicks a desired capture position to determine an enlargement position (step S18), and clicks a setting button 111 on the operation window 105. With this operation, the personal computer body 82 calculates the central position of the image to be enlarged from the current stage position, the set magnification, and the position of the mouse point on the observation image. The personal computer body 82 then automatically moves the macro/micro motor-driven stage 75 to make the central position of the image to be enlarged coincide with the optical axis of the selected observation unit. With this operation, a desired observation position on the specimen is set (step S19).

The observer adjusts a zoom magnification so as to display a desired observation area of the specimen, and makes focus adjustment (step S20).

If it is determined in step S17 that the minute portion of the observation image is not enlarged, the flow immediately advances to step S20. The observer then adjusts a zoom magnification so as to display a desired observation area of the specimen, and makes focus adjustment.

The observer determines whether or not the contrast of the observation image is sufficient (step S21). If the fluorescence illumination source or specimen is low, a clear reference image cannot be generated. Hence, high-precision image comparison cannot be done. In this case, image integration processing is performed (step S22).

In this case, first of all, the observer selects an automatic contrast button 112 on the operation window 105 to perform automatic contrast processing. With this operation, the personal computer body 82 performs gain or offset adjustment to set an optimal luminance level for the captured image, and changes the image data. The personal computer body 82 then displays the resultant image in the observation image display area 109 again. The observer adjusts the observation position, magnification, and focus of the specimen while looking at this image. The observer selects an integration button 113 on the operation window 105 to start image integration processing. With this operation, the personal computer body 82 stores captured images by a set image count, adds the image data, and displays the resultant image in the observation image display area 109 again. The observer adjusts the number of times of integration by setting an integration count 114 on the operation window 105 in accordance with the brightness of the specimen, thus adjusting the image to facilitate observation.

When these preparations are finished, an image registration button 115 on the operation window 105 on the monitor is operated to register the displayed image as a reference image (step S23). In this case, the personal computer body 82 captures a video signal from the TV camera 76 in the form of a digital image through the image input board 6, and stores it as a reference image in a storage medium 10. In addition, the personal computer body 82 displays this image in a still image display area 116. The personal computer body 82 also checks photographing conditions set at this time through communication with the observation device 69 and TV camera 76, and records the conditions on a photographing condition file in the personal computer body 82.

This communication is performed through the macro/micro communication cable 98 and TV camera communication cable 100.

In registering a reference image, reference image data may be read out from the personal computer body 82 or from a recording medium in another personal computer through a communication means such as a network and registered by selecting a file read button 117 on the operation window 105. In this case, the procedure in steps S11 to S23 is not required. Alternatively, the procedure from step S11 to step S23 may be automated where possible regardless of operation by the observer.

An observation image of a specimen to be compared is acquired and compared with the reference image (steps S24 to S42 to be described later). The observer sets a sample specimen for comparison from which a comparison image is to be generated in placed of the sample specimen for the generation of a reference image which is set on the macro/micro motor-driven stage 75 (step S24). The observer then selects a photographing condition button 118. As a consequence, the personal computer body 82 reads out the photographing condition file formed when the reference image was registered, and performs automatic control on the observation device 69 side through the macro/micro communication cable 98 so as to, for example, position the macro/micro motor-driven stage 75, select a zoom magnification and an illumination method, perform brightness control, and set the TV camera 76. This makes observation conditions coincide with the conditions set when the reference image was acquired. A live image of an observation image photographed by the TV camera 76 is then displayed in the observation image display area 109.

Note that even if photographing operation is performed under the same photographing conditions, a difference in tint or the like may occur between images owing to errors caused in the micro-observation unit 71 and macro-observation unit 72 by deterioration in the quality of the lamps of illumination devices, lenses, and the like. The personal computer body 82 therefore performs color adjustment in the image input board so as to make the reference image and comparison image coincide with each other in terms of color reproduction. For example, the personal computer body 82 performs color adjustment in the image input board to make the reference image coincide with the comparison image in terms of luminance information of red, green, and blue as color information of a feature point and background.

The observer then checks from the displayed observation image display area 109 whether or not an area of the specimen which he/she wants to observe is displayed, and adjusts the zoom magnification and focus (step S25).

The observer checks whether or not the contrast of the image is sufficient (step S26). If the contrast of fluorescence illumination or the specimen is low, the image cannot be made clear without any processing in subsequent observation. In this case as well, image integration processing is performed (step S27).

First of all, the observer selects the automatic contrast button automatic contrast button 112 on the operation window 105 of the monitor to perform automatic contrast processing. With this operation, the personal computer body 82 performs gain or offset adjustment to set an optimal luminance level for observation of the captured image, and changes the image data. The personal computer body 82 then displays the resultant image in the observation image display area 109 again. The observer adjusts the observation position, magnification, and focus of the specimen while looking at this image. The observer selects the integration button 113 on the operation window 105 to start image integration processing. With this operation, the personal computer body 82 stores captured images by a set image count, adds the image data, and displays the resultant image in the observation image display area 109 again. The observer adjusts the number of times of integration by setting the integration count 114 on the operation window 105 in accordance with the brightness of the specimen, thus adjusting the image to facilitate observation. Note that the acquisition and display of an observation image in steps S24 to S27 can be automated as in the case of the acquisition of a reference image.

With this operation, the photographing conditions for a reference image are made to coincide with those for a comparison image. This makes it possible to photograph images that can be easily compared with each other. The processing of comparing the images is then started.

Referring to FIG. 17, the observer selects an image comparison mode suitable for the specimens from "split image display", "overlap display", and "image switching display" on the operation window on the monitor (step S28). With this selection of the image comparison mode, an image from the TV camera 76 is displayed as a comparison image in a live image display area 119.

In split image display as the first image comparison mode, the observation image display area 109 is split into two upper and lower or left and right areas, so that a reference image formed from a still image is displayed in one split area, and a comparison image formed from a moving or still image is displayed in the other split area. Upon selection of this split mode, a display method for split image display is selected (step S29). The display methods for split image display include: "left: reference image•right: comparison image", "left: comparison image•right: reference image", "upper: reference image•lower: comparison image", and "upper: comparison image•lower: reference image". These methods can be selected by buttons 120. Note that a ruled line serving as a boundary line that splits the area can be moved with ruled line moving buttons 133.

The observer selects a display method for split image display which is suitable for areas of specimens which are to be compared with each other. In this case, a vertical scroll bar 121 and horizontal scroll bar 122 are arranged for the reference image displayed in one split area of the observation image display area 109. The display position of the reference image is adjusted by moving the scroll bars (step S30). In this case, the personal computer body 82 automatically moves the macro/micro motor-driven stage 75 in accordance with the movement amounts of the scroll bars so as to make the image display position of the reference image coincide with that of the comparison image. A live image is displayed as a comparison image displayed in the other split area of the observation image display area 109. If the observer wants to finely adjust the position of the comparison image as needed, he/she adjusts the display position of the comparison image by moving the macro/micro motor-driven stage 75 while checking the image.

In overlap display as the second image comparison mode, the image obtained by multiplying the luminance ratio between a reference image and a comparison image by m/n where n and m are arbitrary integers (n≧m) is added to the image obtained by multiplying the luminance ratio by (n−m)/n, and the resultant image is displayed in the observation image display area 109, thereby allowing the observer to observe an image having the reference image and comparison image seen through each other. Note that when the luminance ratio between the reference image and the comparison image is gradually changed by changing the integers n and m, one of the images can be emphasized and displayed.

In this case, the observer selects an overlap button 123 (step S31), and adjusts the positions of the reference image and comparison image (step S32), thus eliminating the slight positional error between the reference image and the comparison image by moving the macro/micro motor-driven stage 75 while checking the overlap image. The observer checks the overlap image to find a mismatch. In adjustment of a display ratio (step S33), if the observer wants to emphasize one of the images, he/she changes a display ratio adjustment bar 124. This makes it possible to increase the display ratio of one of the images and display the resultant image.

In image switching display (animation) as the third image comparison mode, two images, i.e., a reference image and comparison image, are repeatedly and alternately switched and displayed in the observation image display area at predetermined time intervals. The observer selects the overlap button 123 in advance (step S34) and adjusts the positions of the reference image and comparison image (step S35), thus eliminating the slight positional error between the reference image and the comparison image. The observer then selects an image switching display (animation) button 125 (step S36), and checks a mismatch while checking the switched images. That is, the observer recognizes a different portion by the persistence of vision by alternately switching the images. In this case, the observer sets a switching time (step S37) to observe the images upon setting a switching time suitable for comparison by operating the internal electrode 126.

Note that an up/down button 127, left/right button 128, and negative button 129 are arranged in the still image display area 116 to change the display method for a reference image. When, for example, the states of the upper and lower surfaces of a specimen are to be compared with each other, the reference image can be vertically and horizontally reversed by using the up/down button 127 and left/right button 128 so as to make the direction of the image photographed from the lower surface side coincide with the direction of the image photographed from the upper surface side. Depending on specimens, positive/negative reversal of an image on one side by means of the negative button 129 facilitates recognition of image comparison.

When image comparison is completed, the observer selects an automatic foreign object detection button 130. As a consequence, in automatic foreign object detection processing (step S38), the personal computer body 82 compares binary images of the reference image and comparison image, and colors a different portion or displays it with a mark or the like, thereby supporting image comparison by the observer. The observer then visually observes the images and compares the images with each other upon referring to the automatic foreign object detection processing (step S39).

When the observer selects a comment button 131, a drawing function allows the observer to input a comment on a reference image, a comparison image, or a observation image in the image comparison mode (step S40). The observer then adds a supplementary remark. When the observer causes an image required to be stored to be displayed in the observation image display area 109 and selects an image storage button 132, the image is stored in a desired storage medium (step S41). At this time, the personal computer body 82 also stores observation conditions for the stored image.

Subsequently, the observer determines whether to continue detailed comparison observation upon changing the observation portions of the specimens (step S42). If comparison observation is to be continued, the flow returns to step S11 to repeat the above operation. If comparison observation is not to be continued, the observation is finished.

With this operation, the observer can easily compare and observe a reference image and comparison image upon making the characteristic portions of the specimens more clear by using the micro-observation unit 71, the macro-observation unit 72, various kinds of illumination devices, and the respective image comparison modes.

In addition, the observer can observe a reference image stored in advance and a comparison image that is being photographed by the micro-observation unit 71 or macro-observation unit 72 under the same observation conditions as those in the past. The observer can also easily compare and observe a characteristic feature of a specimen observed in the past and a characteristic feature of a currently observed specimen under the same conditions.

The observation conditions set when an image is stored are stored together with image data. If, for example, the observation conditions are stored in a shared storage medium, the same observation conditions as those set when image comparison was performed by using images used in the past can be automatically set in any system, thereby greatly improving the efficiency of reexamination.

Assume that the observer wants to continue observation upon changing the magnification and positions. In this case, when the observer designates a magnification and positions, the macro/micro motor-driven stage 75 automatically moves to the observation position, and the magnification changes. This makes it possible to easily set observation positions of the reference image and comparison image and a magnification. The use of various kinds of image comparison modes facilitates comparison between a reference image and a comparison image. This allows the observer to easily find the difference between the images. In addition, this makes it possible to perform high-precision image comparison.

Each embodiment described above has exemplified the case wherein both the micro-observation unit 2 and the macro-observation unit 3 are prepared as means for capturing observation images of specimens. Obviously, however, the present invention can be realized even by using only one of the micro-observation unit 2 and macro-observation unit 3.

Note that the embodiments of the present invention incorporate the following programs and recording medium on which the programs are recorded:

(1) A computer-readable recording medium storing a program for capturing a macroscopic or microscopic observation image of a specimen, photographing the captured observation image, and displaying an entire or part of a comparison image obtained from the photographed observation image and an entire or part of a reference image prepared in advance so as to allow comparison therebetween.

(2) In description (1), a computer-readable recording medium storing a program for displaying at least the comparison image in the form of a live image.

(3) A computer-readable recording medium storing a program for capturing a macroscopic or microscopic observation image of a specimen, photographing the captured observation image, adding a comparison image obtained from the photographed observation image and a reference image prepared in advance at an arbitrary ratio, and displaying the resultant image as an addition image.

(4) A computer-readable recording medium storing a program for capturing a macroscopic or microscopic observation image of a specimen, photographing the captured observation image, and alternately displaying a comparison image obtained from the photographed observation image and a reference image prepared in advance at predetermined time intervals.

(5) In any one of descriptions (1) to (4), a computer-readable recording medium storing a program for displaying the comparison image obtained from the observation image while allowing brightness of the image to be adjusted by integration processing.

(6) In any one of descriptions (1) to (4), a computer-readable recording medium storing a program for displaying the comparison image and reference image upon superimposing a lattice with a predetermined spacing on the image.

(7) A computer-readable recording medium storing a program for capturing a macroscopic or microscopic observation image of a specimen, photographing the captured observation image, subtracting a comparison image obtained from the photographed observation image and a reference image prepared in advance, and performing highlighting on the basis of the subtraction result.

As has been described above, according to the present invention, there are provided an image comparison apparatus and image comparison method which can perform comparison observation of a reference image and comparison image by simple operation with high precision and efficiency, and a program for causing a computer to execute image comparison.

What is claimed is:

1. An image comparison apparatus comprising:
   observation image capturing means for capturing at least one of a macroscopic observation image of a specimen and a microscopic observation image of the specimen;
   photographing means for photographing the observation image captured by the observation image capturing means;
   recording means for recording a reference image prepared in advance; and
   display means for displaying the reference image and a comparison image photographed by the photographing means so as to allow comparison observation therebetween;
   wherein the display means comprises a first image display area in which the reference image is displayed, a second image display area in which the comparison image is displayed, and a third image display area in which the reference image and the comparison image are simultaneously displayed to allow the comparison observation.

2. The apparatus according to claim 1, wherein the observation image capturing means comprises at least one of:
   illumination means for irradiating the specimen with light so as to make scattered light therefrom observable,
   illumination means for irradiating the specimen with light so as to make fluorescence therefrom observable,
   illumination means for irradiating the specimen with polarized light so as to make scattered light therefrom observable, and
   illumination means for transmitting light through the specimen so as to make transmitted light observable.

3. The apparatus according to claim 1, wherein the display means displays the comparison image as a live image.

4. The apparatus according to claim 1, wherein an addition image obtained by adding the comparison image and the reference image at an arbitrary ratio is displayed in the third image display area.

5. The apparatus according to claim 1, wherein the comparison image and the reference image are alternately displayed in the third image display area at predetermined time intervals.

6. The apparatus according to claim 1, wherein at least one of the comparison image and the reference image is displayed in the third image display area after a brightness thereof is adjusted by integration processing.

7. The apparatus according to claim 1, wherein the comparison image and the reference image are displayed in the third image display area with a lattice with a predetermined spacing superimposed thereon.

8. The apparatus according to claim 1, wherein subtraction between the comparison image and the reference image is performed and the comparison image is displayed in the third image display area based on a result of the subtraction.

9. An image comparison apparatus comprising:
   a macro-observation unit including an optical system for observing a macroscopic observation image of a specimen;
   a micro-observation unit which is disposed at a position different the macro-observation unit which and includes an optical system for observing a microscopic observation image of the specimen;
   a stage which moves the specimen between the macro-observation unit and the micro-observation unit;
   a camera which photographs at least one of the macroscopic observation image and the microscopic observation image of the specimen on the stage;
   optical path switching means for switching between optical paths from the macro-observation unit and the micro-observation unit to the camera;
   a recording medium which records an observation image photographed by the camera as a reference image; and
   display means for displaying the observation image photographed by the camera as a comparison image and the reference image recorded on the recording medium so as to allow comparison between the comparison image and the reference image.

10. The apparatus according to claim 9, wherein each of the macro-observation unit and the micro-observation unit comprises:
    at least one of: a polarization illumination source, an epi-illumination source, fluorescence illumination source, a focal illumination source, transmitted illumination source, and an infrared illumination source; and
    means for operating brightness and an ON/OFF operation of the at least one illumination source.

11. The apparatus according to claim 9, wherein the display means comprises:
    a first image display area in which the reference image is displayed;
    a second image display area in which the comparison image is displayed; and
    a third image display area in which the reference image and the comparison image are simultaneously displayed so as to allow comparison and observation of the reference image and the comparison image.

12. The apparatus according to claim 11, further comprising:
    split image display means for splitting the third image display area one of vertically and horizontally into split first and second partial areas for respectively displaying the reference image and the comparison image, and for vertically and horizontally moving the displayed images;

overlap image display means for displaying, in the third image display area, an image obtained by adding: (a) an image obtained by multiplying a luminance ratio between the reference image and the comparison image by m/n where n and m are arbitrary integers (n≦m) to (b) an image obtained by multiplying the luminance ratio by (n−m)/n, and for gradually adjusting the luminance ratio between the reference image and the comparison image by changing the integers n and m; and image switching display means for alternately switching and displaying the reference image and the comparison image in the third image display area at predetermined time intervals, and for adjusting an image switching time.

13. An image comparison method comprising:

capturing at least one of a macroscopic observation image and a microscopic observation image of a specimen;

photographing the captured observation image;

displaying a reference image prepared in advance in a first display area of a display unit;

displaying a comparison image obtained from the photographed observation image in a second display area of the display unit; and displaying, in a third display area of the display unit, at least a part of the reference image displayed in the first display area and at least a part of the comparison image displayed in the second display area so as to allow comparison therebetween.

14. The method according to claim 13, wherein at least one of the comparison image and the reference image has a brightness thereof adjusted by integration processing before being displayed.

15. The method according to claim 13, wherein the comparison image and the reference image are displayed in the third display area with a lattice with a predetermined spacing superimposed thereon.

16. The method according to claim 13, wherein at least one of the comparison image and the reference image is displayed as a live image.

17. An image comparison method comprising:

capturing at least one of a macroscopic observation image and a microscopic observation image of a specimen;

photographing the captured observation image;

displaying a reference image prepared in advance in a first display area of a display unit;

displaying a comparison image obtained from the photographed observation image in a second display area of the display unit; and displaying, in a third display area of the display unit, an addition image obtained by adding the reference image displayed in the first display area and the comparison image displayed in the second display area at an arbitrary ratio.

18. The method according to claim 17, wherein at least one of the comparison image and the reference image has a brightness thereof adjusted by integration processing before being displayed.

19. The method according to claim 17, wherein the comparison image and the reference image are displayed in the third display area with a lattice with a predetermined spacing superimposed thereon.

20. An image comparison method comprising:

capturing at least one of a macroscopic observation image and a microscopic observation image of a specimen;

photographing the captured observation image;

displaying a reference image prepared in advance in a first display area of a display unit;

displaying a comparison image obtained from the photographed observation image in a second display area of the display unit; and alternately displaying, in a third display area of the display unit, the reference image displayed in the first display area and the comparison image displayed in the second display at predetermined time intervals.

21. The method according to claim 20, wherein at least one of the comparison image and the reference image has a brightness thereof adjusted by integration processing before being displayed.

22. The method according to claim 20, wherein the comparison image and the reference image are displayed in the third display area with a lattice with a predetermined spacing superimposed thereon.

23. An image comparison method comprising:

capturing at least one of a macroscopic observation image and a microscopic observation image of a specimen;

photographing the captured observation image;

displaying a reference image prepared in advance in a first display area of a display unit;

displaying a comparison image obtained from the photographed observation image in a second display area of the display unit;

performing subtraction between the reference image displayed in the first display area and the comparison image displayed in the second display area; and displaying the comparison image in a third display area of the display unit based on a result of the subtraction.

24. A computer-readable storage medium having computer-readable program code stored thereon that is executable by a computer to cause the computer to perform a process comprising:

capturing at least one of a macroscopic observation image and a microscopic observation image of a specimen;

photographing the captured observation image;

displaying a reference image prepared in advance in a first display area of a display unit;

displaying a comparison image obtained from the photographed observation image in a second display area of the display unit;

displaying, in a third display area of the display unit, at least a part of the reference image displayed in the first display area and at least a part of the comparison image displayed in the second display area so as to allow comparison therebetween.

25. The program according to claim 24, wherein at least one of the comparison image and the reference image has a brightness thereof adjusted by integration processing before being displayed.

26. The program according to claim 24, wherein the comparison image and the reference image are displayed in the third display area with a lattice with a predetermined spacing superimposed thereon.

27. The program according to claim 24, wherein at least one of the comparison image and the reference image is displayed as a live image.

28. A computer-readable storage medium having computer-readable program code stored thereon that is executable by a computer to cause the computer to perform a process comprising:

capturing at least one of a macroscopic observation image and a microscopic observation image of a specimen;

photographing the captured observation image;
displaying a reference image prepared in advance in a first display area of a display unit;
displaying a comparison image obtained from the photographed observation image in a second display area of the display unit; and
displaying, in a third display area of the display unit, an addition image obtained by adding the reference image displayed in the first display area and the comparison image displayed in the second display area at an arbitrary ratio.

29. The program according to claim 28, wherein at least one of the comparison image and the reference image has a brightness thereof adjusted by integration processing before being displayed.

30. The program according to claim 28, wherein the comparison image and the reference image are displayed in the third display area with a lattice with a predetermined spacing superimposed thereon.

31. A computer-readable storage medium having computer-readable program code stored thereon that is executable by a computer to cause the computer to perform a process comprising:
capturing at least one of a macroscopic observation image and a microscopic observation image of a specimen;
photographing the captured observation image;
displaying a reference image prepared in advance in a first display area of a display unit;
displaying a comparison image obtained from the photographed observation image in a second display area of the display unit; and
alternately displaying, in a third display area of the display unit, the reference image displayed in the first display area and the comparison image displayed in the second display area at predetermined time intervals.

32. The program according to claim 31, wherein at least one of the comparison image and the reference image has a brightness thereof adjusted by integration processing before being displayed.

33. The program according to claim 31, wherein the comparison image and the reference image are displayed in the third display area with a lattice with a predetermined spacing superimposed thereon.

34. A computer-readable storage medium having computer-readable program code stored thereon that is executable by a computer to cause the computer to perform a process comprising:
capturing at least one of a macroscopic observation image and a microscopic observation image of a specimen;
photographing the captured observation image;
displaying a reference image prepared in advance in a first display area of a display unit;
displaying a comparison image obtained from the photographed observation image in a second display area of the display unit;
performing subtraction between the reference image displayed in the first display area and the comparison image displayed in the second display area; and
displaying the comparison image in a third display area of the display unit based on a result of the subtraction.

35. An image comparison apparatus comprising:
observation image capturing means for capturing an observation image of a specimen;
photographing means for photographing the observation image captured by the observation image capturing means;
recording means for recording a reference image prepared in advance; and
display means for displaying the reference image and a comparison image photographed by the photographing means so as to allow comparison observation therebetween;
wherein the display means comprises a first image display area in which the reference image is displayed, a second image display area in which the comparison image is displayed, and a third image display area in which the reference image and the comparison image are simultaneously displayed to allow the comparison observation.

36. The apparatus according to claim 35, further comprising:
split image display means for splitting the third image display area one of vertically and horizontally into split first and second partial areas for respectively displaying the reference image and the comparison image, and for vertically and horizontally moving positions of the displayed images;
overlap image display means for displaying, in the third image display area, an image obtained by adding: (a) an image obtained by multiplying a luminance ratio between the reference image and the comparison image by mm where n and m are arbitrary integers (n≧m) to an image obtained by multiplying the luminance ratio by (n−m)/n, and for gradually adjusting the luminance ratio between the reference image and the comparison image by changing the integers n and m; and
image switching display means for alternately switching and displaying the reference image and the comparison image in the third image display area at predetermined time intervals, and for adjusting an image switching time.

37. An image comparison method comprising:
capturing an observation image of a specimen;
photographing the captured observation image;
displaying a reference image prepared in advance in a first display area of a display unit;
displaying a comparison image obtained from the photographed observation image in a second display area of the display unit; and
displaying, in a third display area of the display unit, both of the reference image displayed in the first display area and the comparison image displayed in the second display area so as to allow comparison therebetween.

38. A computer-readable storage medium having computer-readable program code stored thereon that is executable by a computer to cause the computer to perform a process comprising:
capturing an observation image of a specimen;
photographing the captured observation image;
displaying a reference image prepared in advance in a first display area of a display unit;
displaying a comparison image obtained from the photographed observation image in a second display area of the display unit; and
displaying, in a third display area of the display unit, both of the reference image displayed in the first display area and the comparison image displayed in the second display area so as to allow comparison therebetween.

* * * * *